May 16, 1939. E. BREITLING ET AL Re. 21,078

CASH REGISTER, ACCOUNTING, AND THE LIKE MACHINE

Original Filed Oct. 5, 1935 15 Sheets-Sheet 1

Ernst Breitling and
Hans Schwenk
Inventors

By Earl Benet
Their Attorney

May 16, 1939. E. BREITLING ET AL Re. 21,078
CASH REGISTER, ACCOUNTING, AND THE LIKE MACHINE
Original Filed Oct. 5, 1935 15 Sheets-Sheet 2
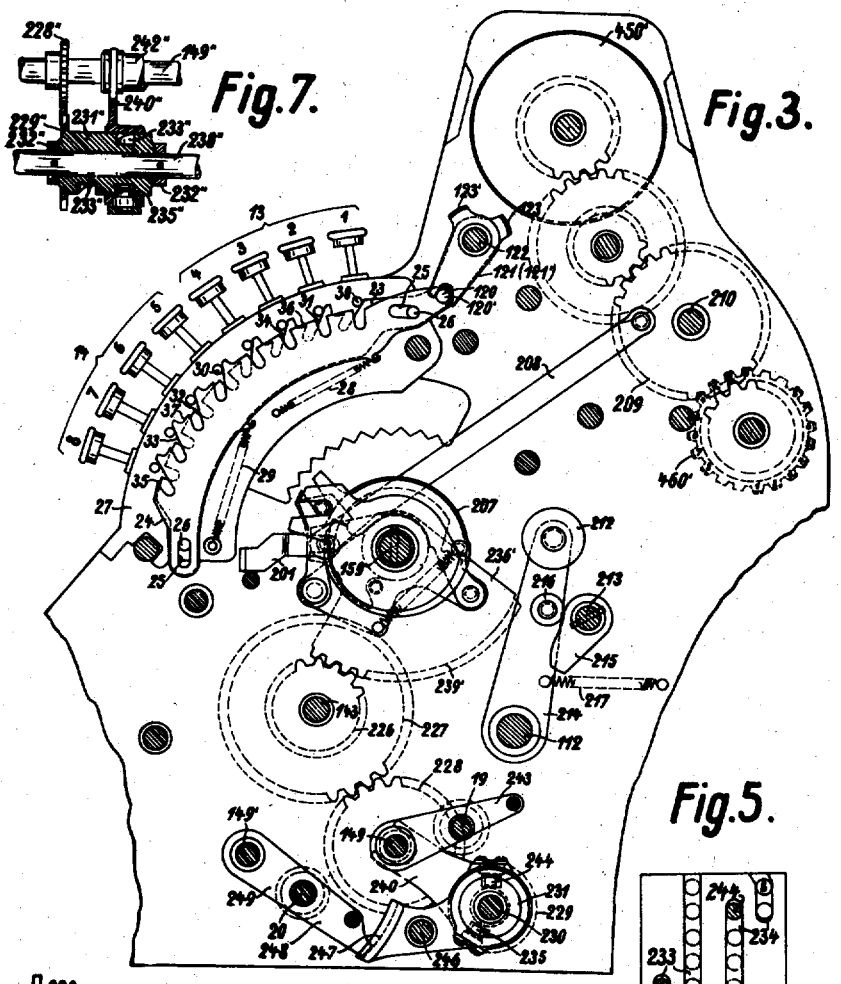
Ernst Breitling and
Hans Schwenk
Inventors
By Kearl Brent
Their Attorney

CASH REGISTER, ACCOUNTING, AND THE LIKE MACHINE

Original Filed Oct. 5, 1935 15 Sheets-Sheet 3

Ernst Breitling and
Hans Schwenk
Inventors

By Earl Benst
Their Attorney

CASH REGISTER, ACCOUNTING, AND THE LIKE MACHINE

Original Filed Oct. 5, 1935 15 Sheets-Sheet 4

Ernst Breitling and
Hans Schwenk
Inventors

By Pearl Brent
Their Attorney

May 16, 1939. E. BREITLING ET AL Re. 21,078

CASH REGISTER, ACCOUNTING, AND THE LIKE MACHINE

Original Filed Oct. 5, 1935 15 Sheets-Sheet 5

Ernst Breitling and
Hans Schwenk
Inventors

By Karl Bunst
Their Attorney

CASH REGISTER, ACCOUNTING, AND THE LIKE MACHINE

Original Filed Oct. 5, 1935 15 Sheets-Sheet 6

Ernst Breitling and
Hans Schwenk
Inventors

By Pearl Benesch
Their Attorney

CASH REGISTER, ACCOUNTING, AND THE LIKE MACHINE

Original Filed Oct. 5, 1935 15 Sheets-Sheet 7

Ernst Breitling and
Hans Schwenk
Inventors

By Karl Bennett
Their Attorney

CASH REGISTER, ACCOUNTING, AND THE LIKE MACHINE

Original Filed Oct. 5, 1935 15 Sheets-Sheet 8

Ernst Breitling and
Hans Schwenk
Inventors

By Earl Benit
Their Attorney

May 16, 1939. E. BREITLING ET AL Re. 21,078

CASH REGISTER, ACCOUNTING, AND THE LIKE MACHINE

Original Filed Oct. 5, 1935 15 Sheets-Sheet 9

Ernst Breitling and
Hans Schwenk
Inventors

By Pearl Berrit
Their Attorney

CASH REGISTER, ACCOUNTING, AND THE LIKE MACHINE
Original Filed Oct. 5, 1935 15 Sheets-Sheet 10
Fig. 33.
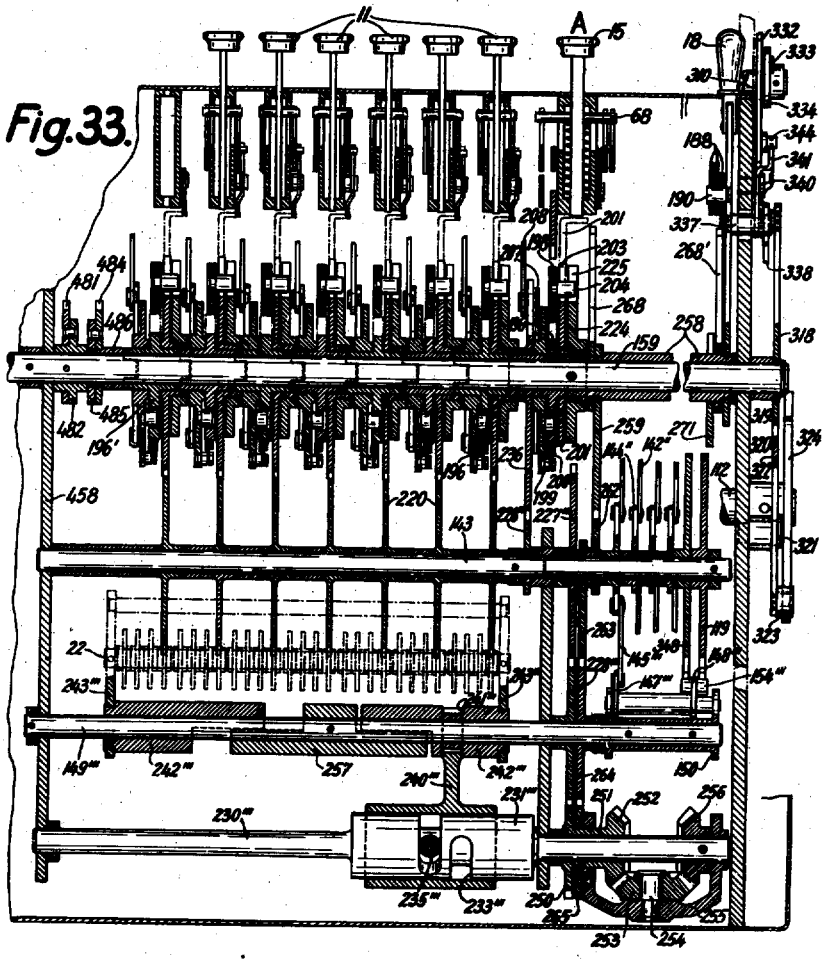
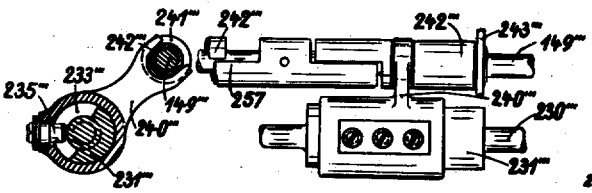
Fig. 19.
Fig. 18.
Fig. 34.
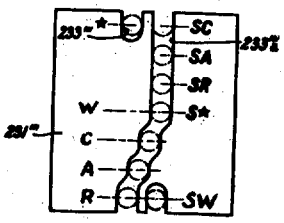
Ernst Breitling and
Hans Schwenk
Inventors
By Earl Benst
Their Attorney

CASH REGISTER, ACCOUNTING, AND THE LIKE MACHINE

Original Filed Oct. 5, 1935 15 Sheets-Sheet 11

Ernst Breitling and
Hans Schwenk
Inventors

By Karl Bennt
Their Attorney

CASH REGISTER, ACCOUNTING, AND THE LIKE MACHINE

Original Filed Oct. 5, 1935 15 Sheets-Sheet 12

Ernst Breitling and
Hans Schwenk
Inventors

By Hearl Brust
Their Attorney

CASH REGISTER, ACCOUNTING, AND THE LIKE MACHINE

Original Filed Oct. 5, 1935 15 Sheets-Sheet 13

Ernst Breitling and
Hans Schwenk
Inventors

By Karl Bennet
Their Attorney

CASH REGISTER, ACCOUNTING, AND THE LIKE MACHINE

Original Filed Oct. 5, 1935 15 Sheets-Sheet 14

Ernst Breitling and
Hans Schwenk
Inventors
By Vincent Benet
Their Attorney

CASH REGISTER, ACCOUNTING, AND THE LIKE MACHINE

Original Filed Oct. 5, 1935 15 Sheets-Sheet 15

Ernst Breitling and
Hans Schwenk
Inventors

By Earl Benet
Their Attorney

Reissued May 16, 1939

Re. 21,078

UNITED STATES PATENT OFFICE 21,078

CASH REGISTER, ACCOUNTING, AND THE LIKE MACHINE

Ernst Breitling, Berlin-Tempelhof, and Hans Schwenk, Berlin, Germany, assignors to The National Cash Register Company, Dayton, Ohio, a corporation of Maryland Original No. 2,101,636, dated December 7, 1937, Serial No. 43,730, October 5, 1935. Application for reissue February 3, 1938, Serial No. 188,506. In Germany February 15, 1935

15 Claims. (Cl. 235—7)

The invention relates to cash registers, accounting and the like machines and more particularly to such machines, in which several rows of preferably interspersed totalizers for amount entering, total and subtotal taking actions as well as printing and indicating devices for recording such data are arranged. Normally machines of that kind are provided with a positively actuated differential device, by which totalizer selection and engagement in proper timing is effected under control of various manipulative means.

The main object of the invention is to reduce the dimensions especially the length of the machine to a minimum without sacrificing any of the necessary functions or subdivisions of the amounts or totals common with such machines.

Another object of the invention is to provide a novel arrangement for totalizer engaging, in item entering and in item total taking of multiple transactions.

Another object of the invention is to arrange novel means for transferring totals taken from one totalizer to another of the same row.

Another object of the invention is to adapt a differential device of a bank of totalizer selecting means to control engagement of two different totalizer rows.

Another object of the invention is to provide novel means for selecting a totalizer in two totalizer rows under control of one single bank of manipulative means.

Another object of the invention is to arrange an itemizing totalizer interspersed with several other totalizers of any kind, special, transaction or the like in one single row and to provide for proper selection of said different totalizers.

Another object of the invention is to provide a novel arrangement for machine release in accordance with the various transactions performed by such a machine.

Another object of the invention is to adapt a machine conditioning means to function differingly for itemizing and other transactions in amount entering and total taking actions.

Another object of the invention is to adapt said machine conditioning means for totalizer selection in total transferring actions.

Another object of the invention is to provide disabling means for the totalizer selecting means in total taking especially multiple item total taking actions.

Another object of the invention is to provide novel interlocking means for the totalizer selecting manipulative means cooperating with the machine release and the amount setting means and to adapt them to function differently in amount entering and total taking actions.

Further objects of the invention will be pointed out in the following detailed description with reference to the annexed drawings.

A preferred form of an embodiment of the invention is shown in the annexed drawings.

Figure 1:
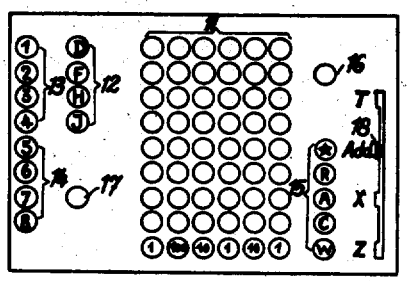
Figure 2:
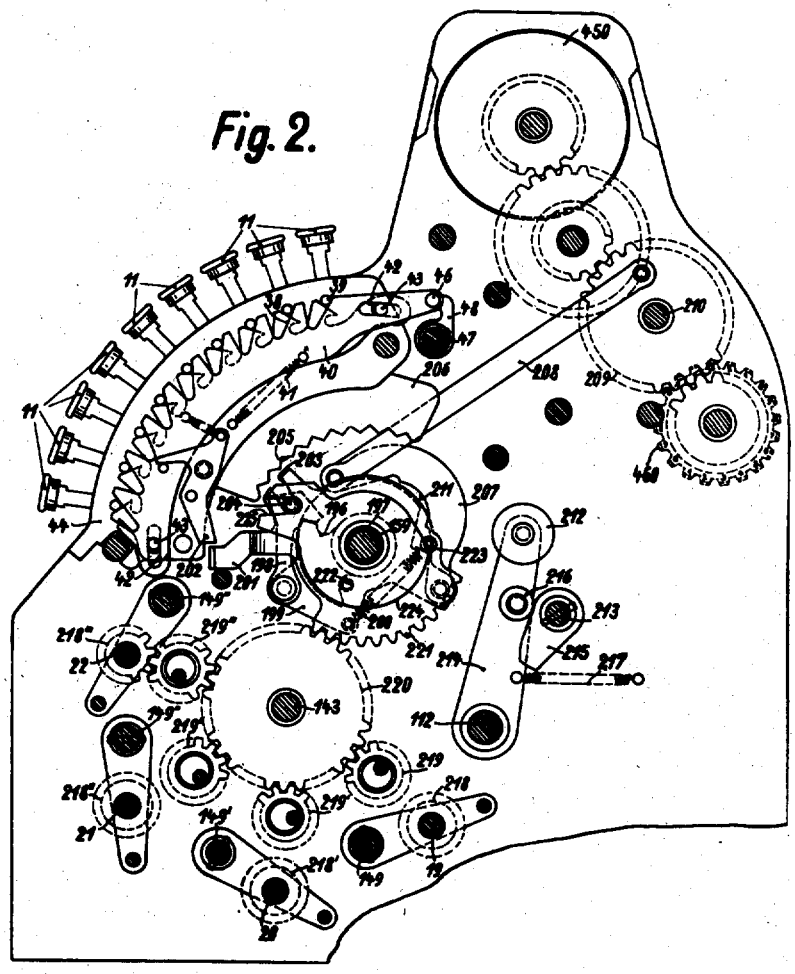
Figure 6C:
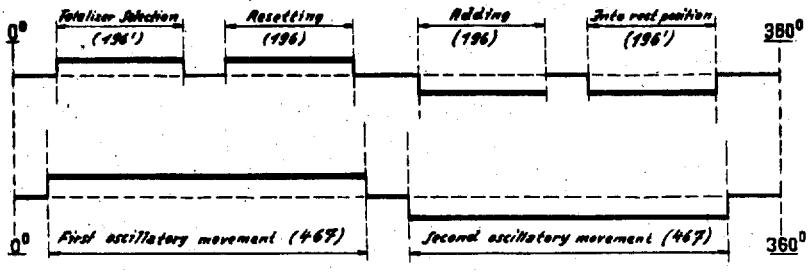
Figure 6:
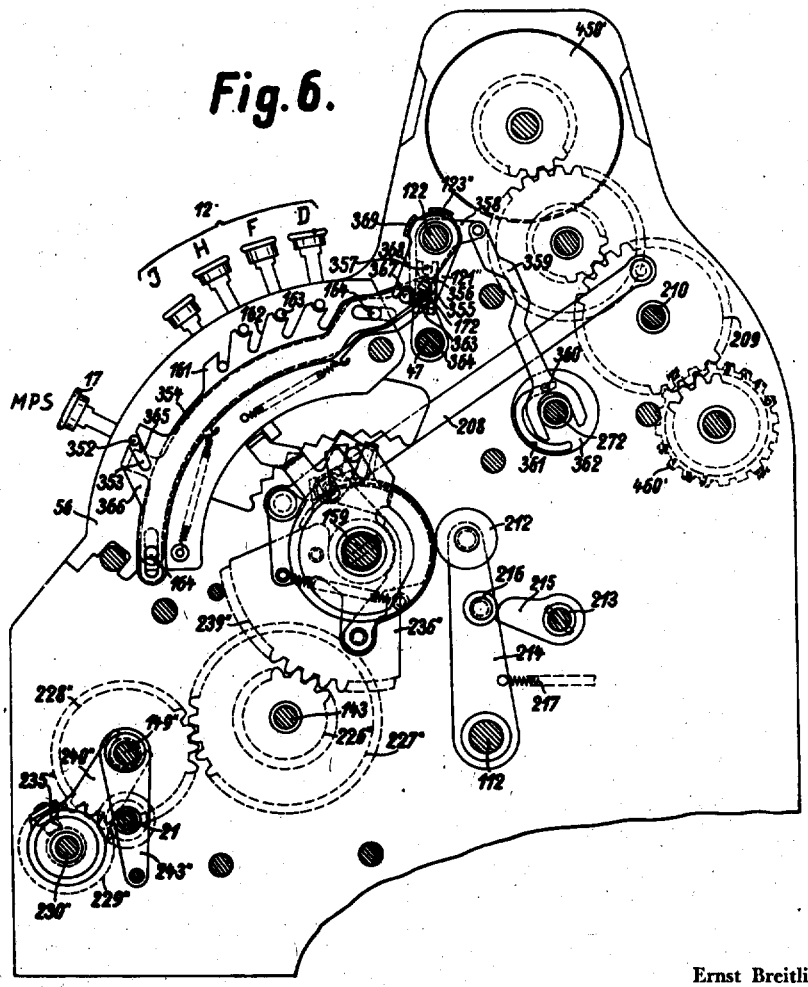
Figure 6B:
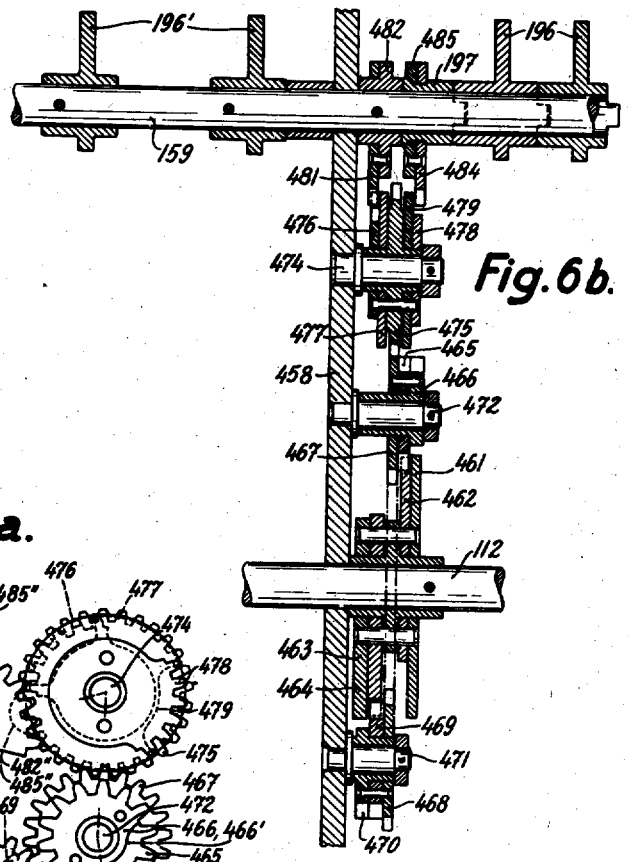
Figure 6A:
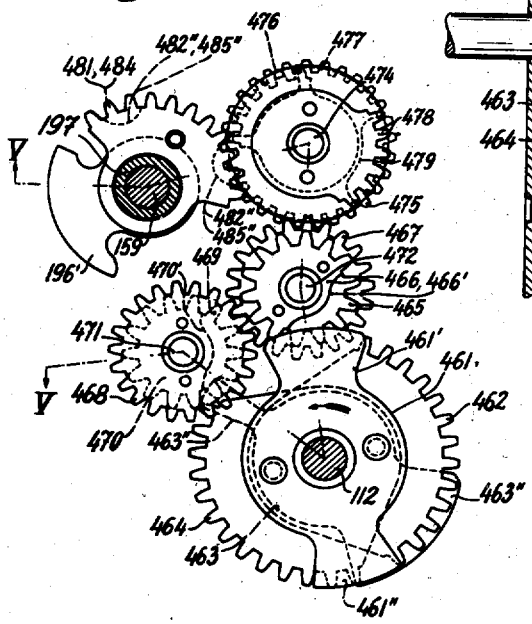
Figure 13:
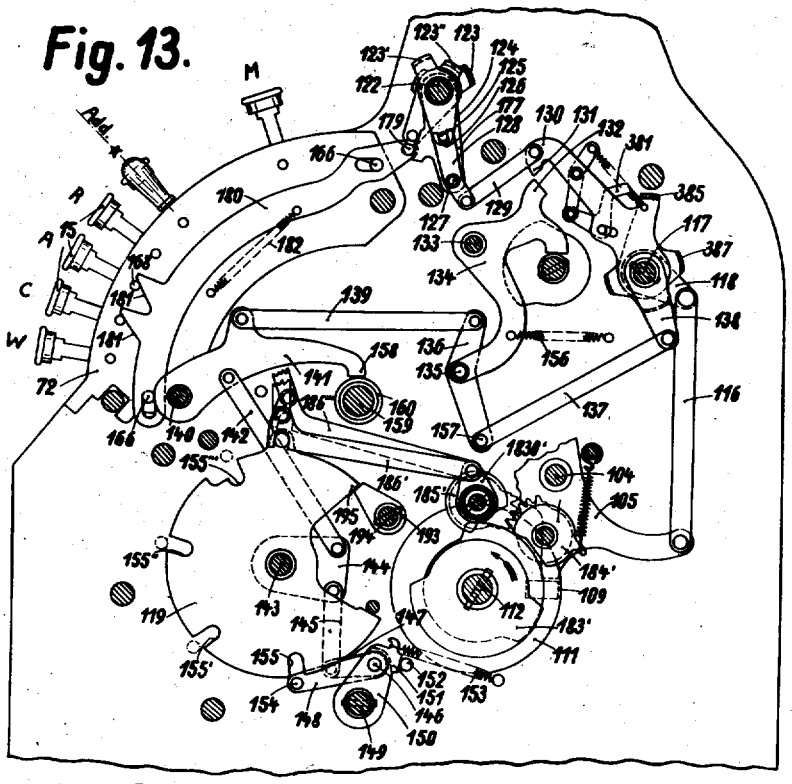
Figure 9:
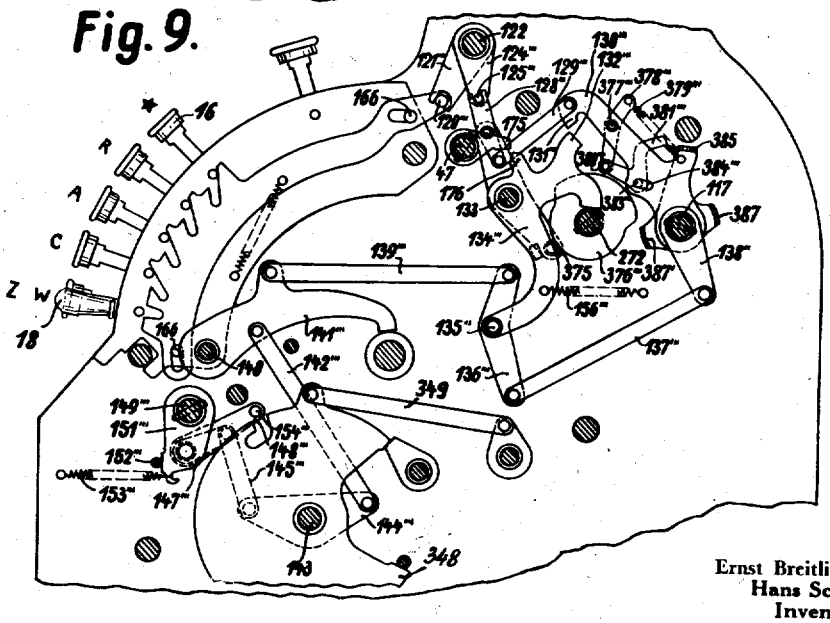
Figure 14:
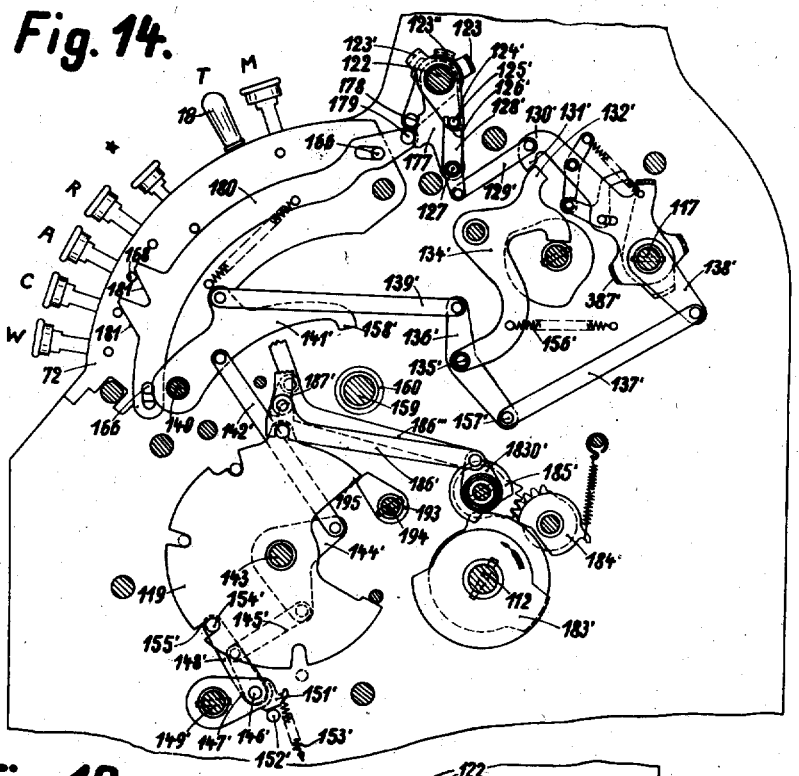
Figure 10:
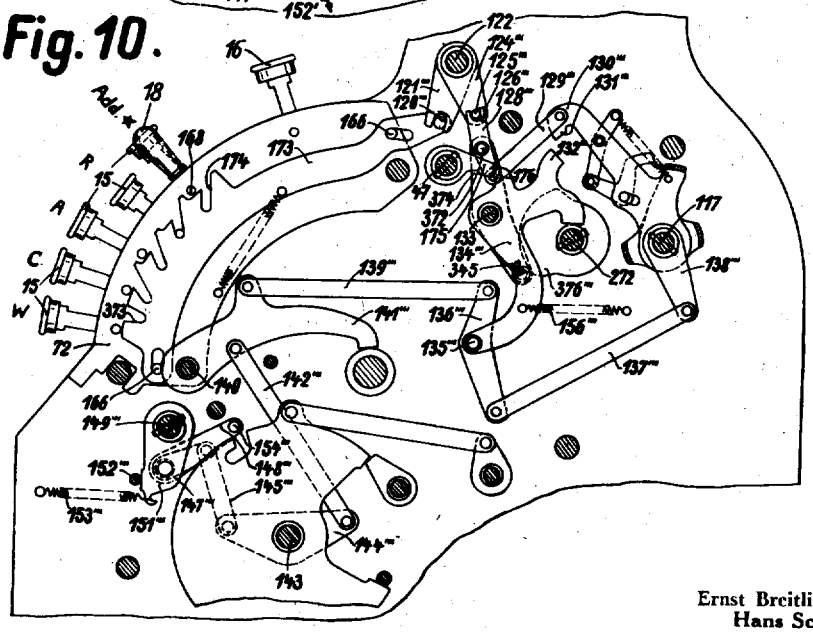
Figure 15:
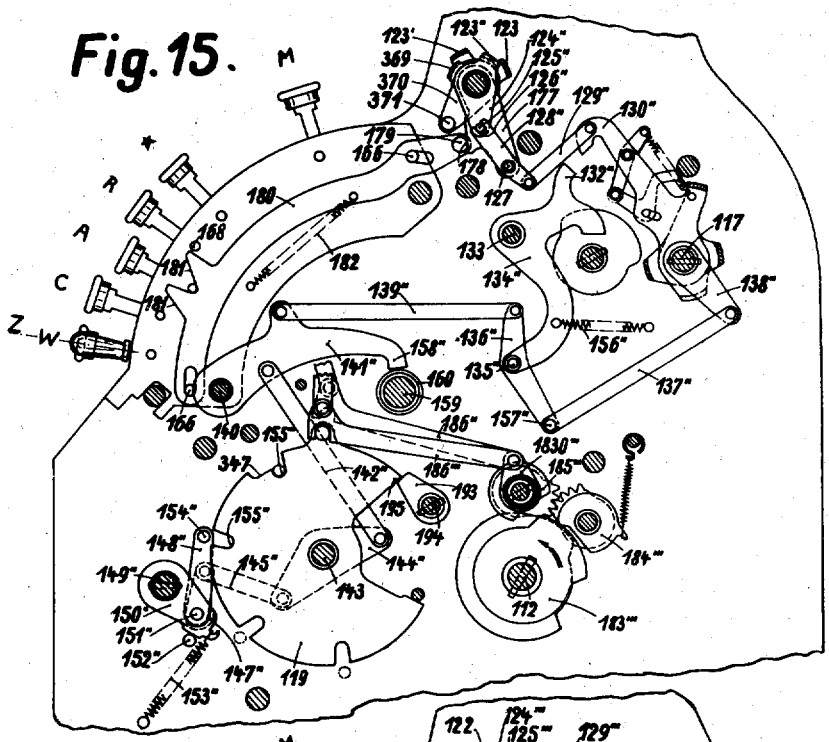
Figure 11:
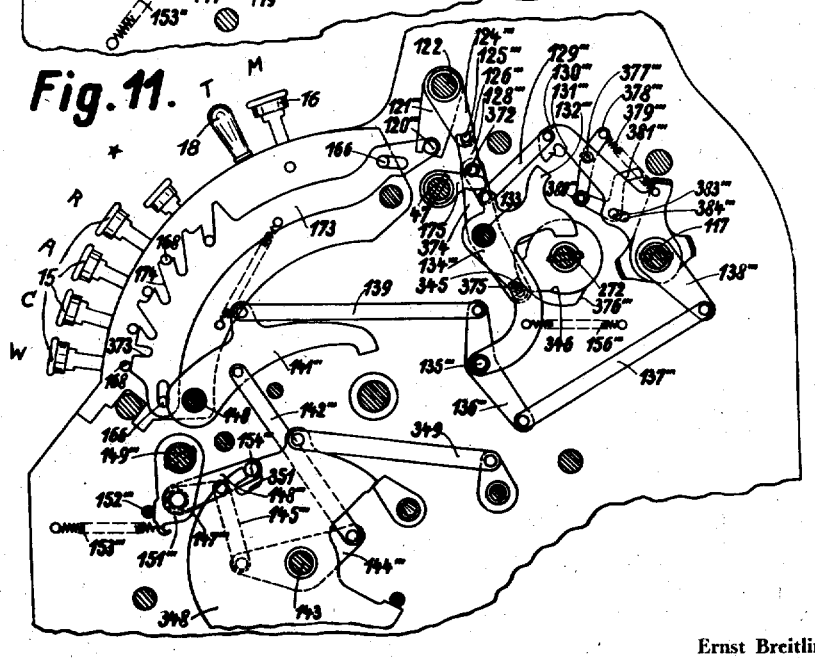
Figure 16:
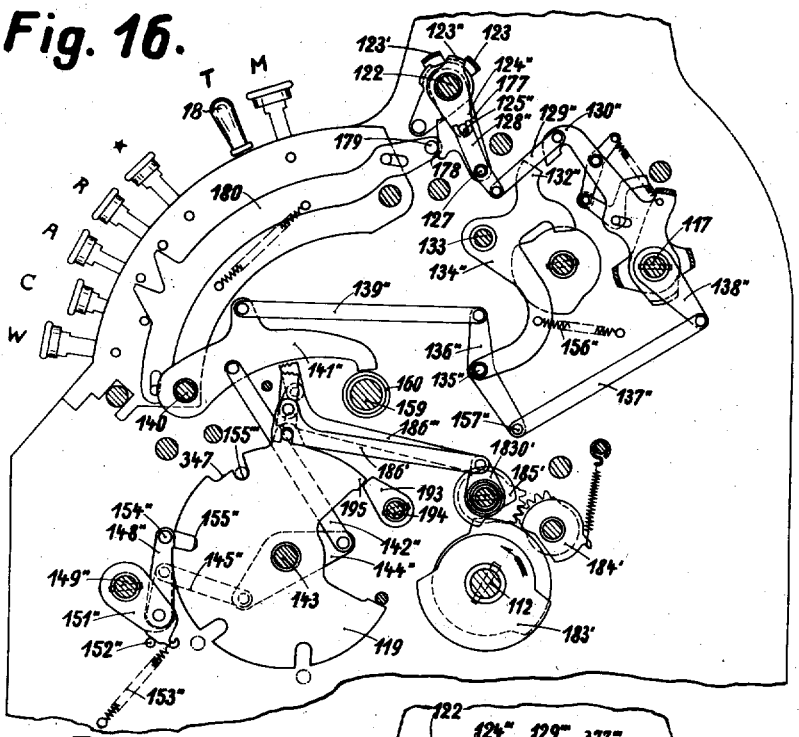
Figure 12:
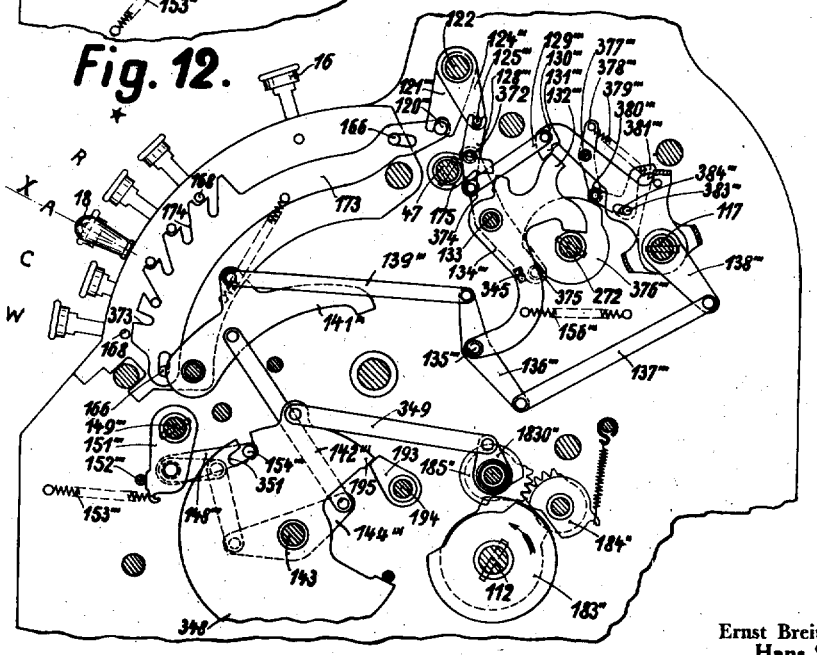
Figure 20:
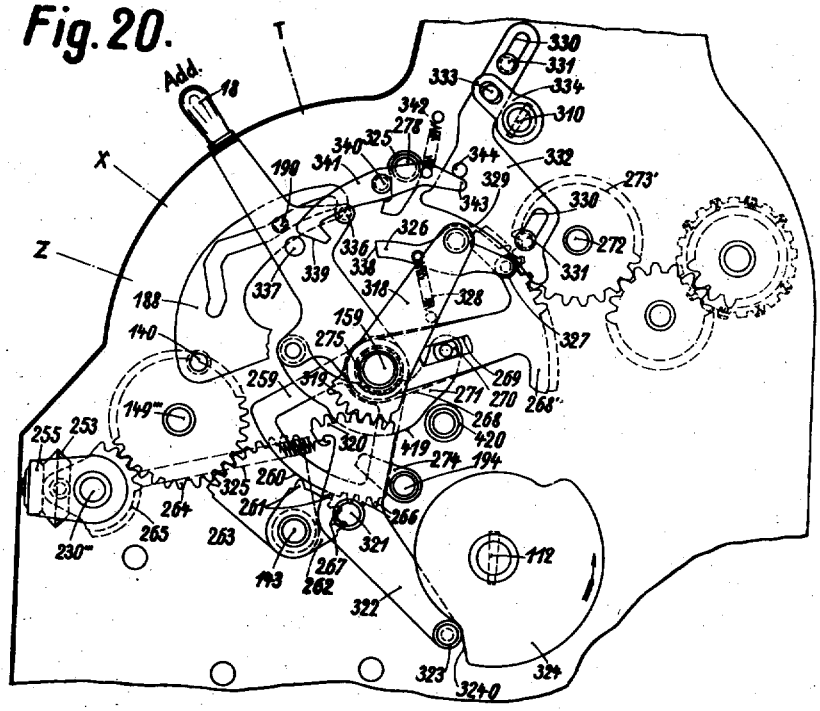
Figure 17:
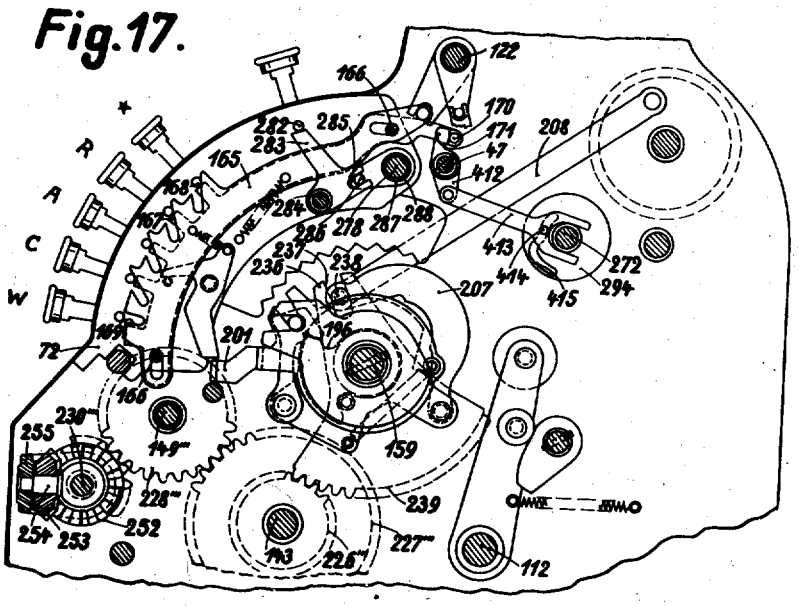
Figure 21:
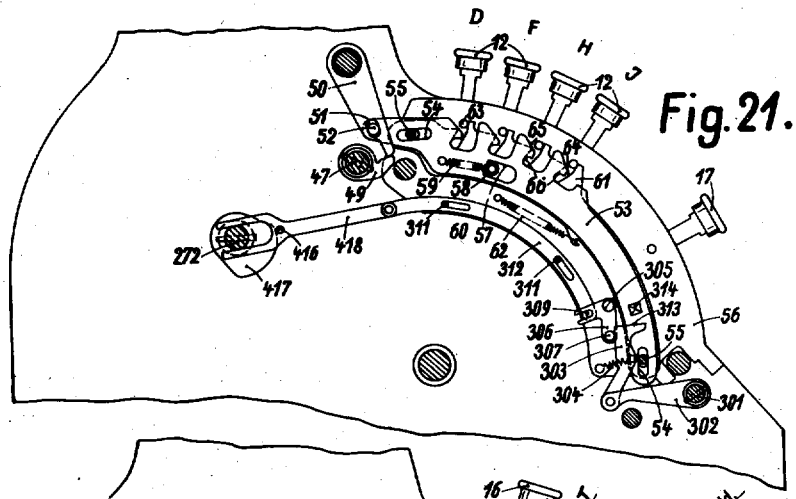
Figure 22:
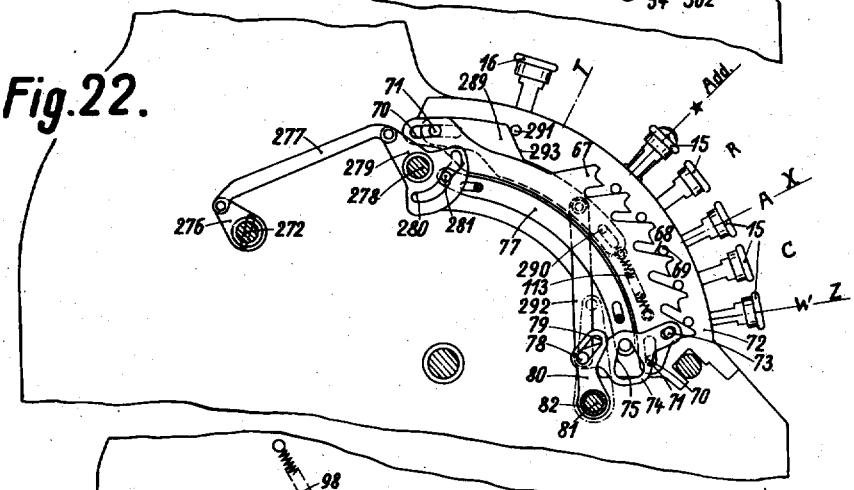
Figure 23:
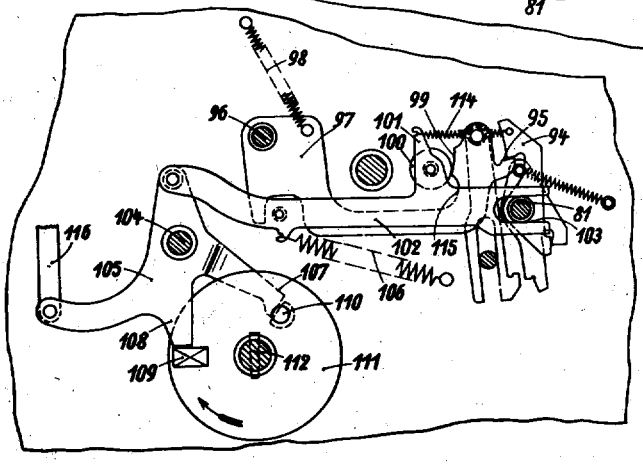
Figure 24:
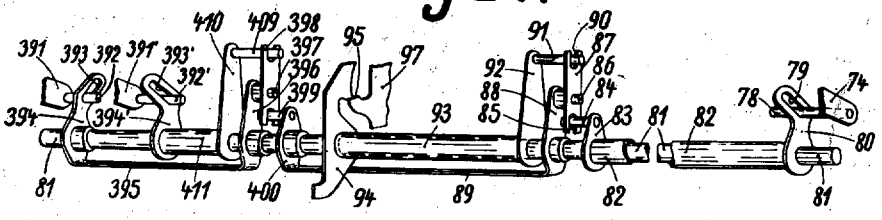
Figure 25:
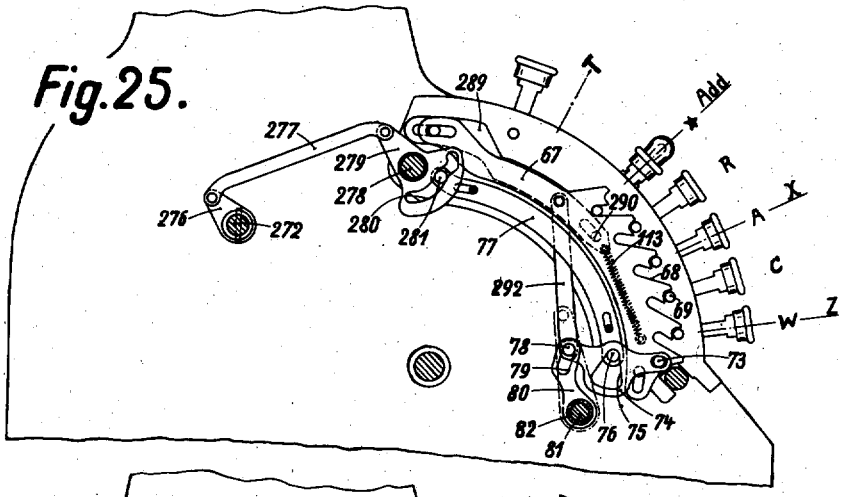
Figure 26:
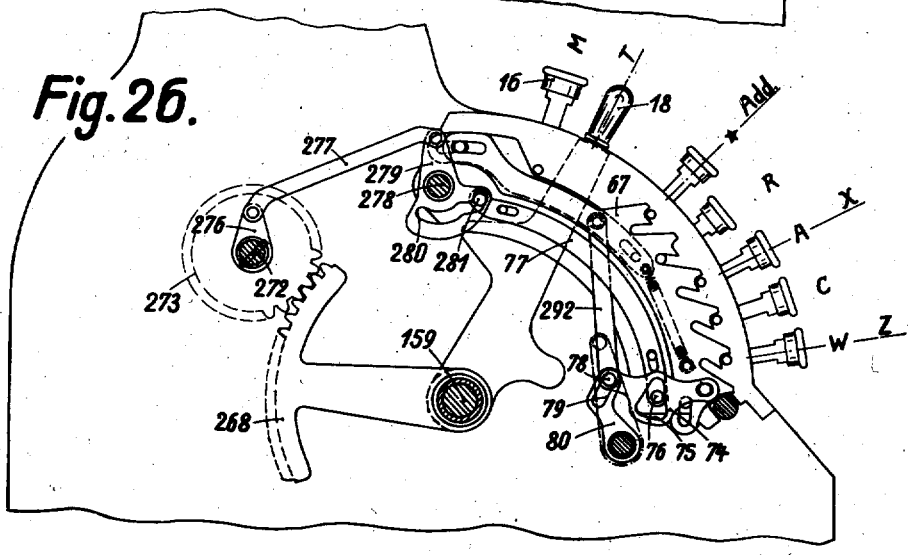
Figure 27:
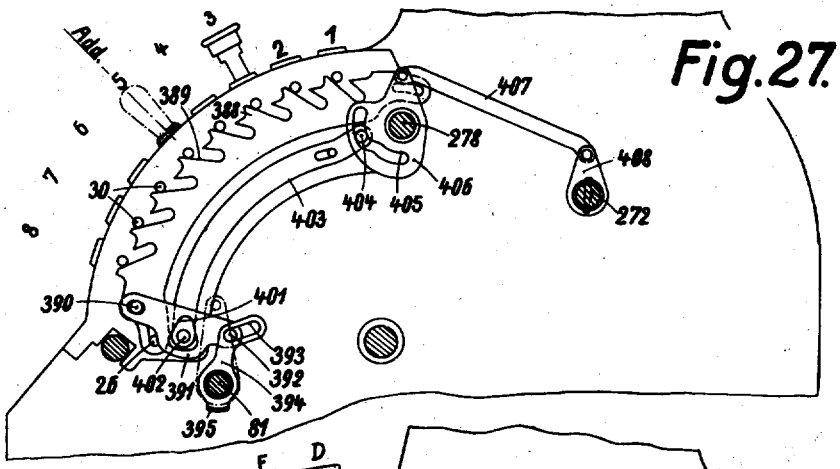
Figure 28:
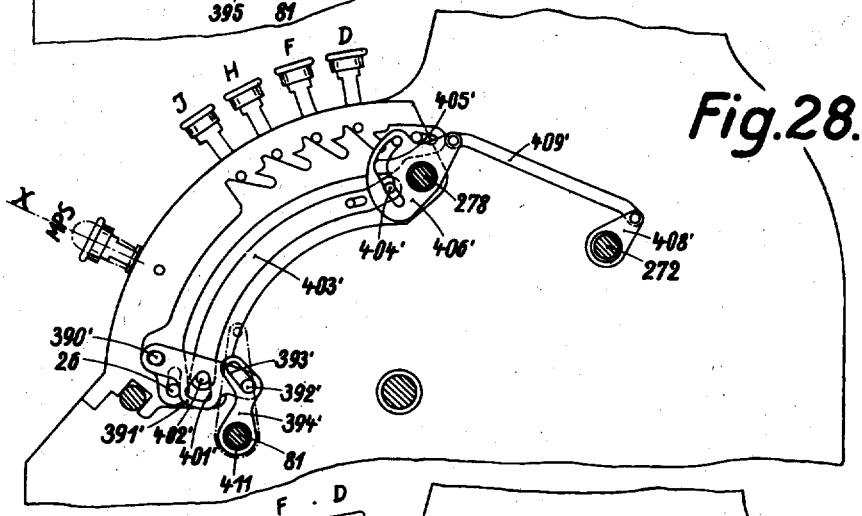
Figure 29:
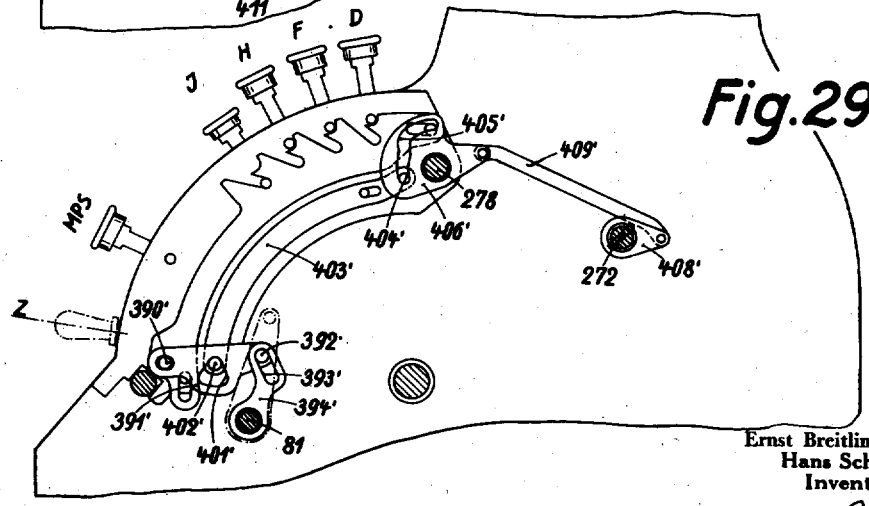
Figure 35:
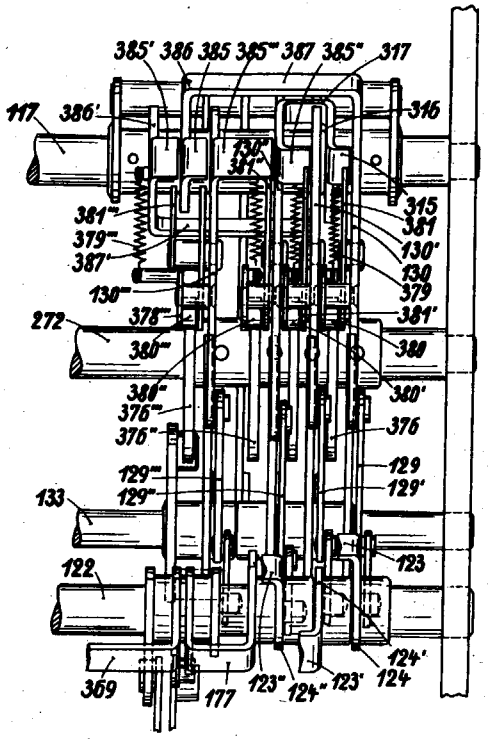
Figure 30:
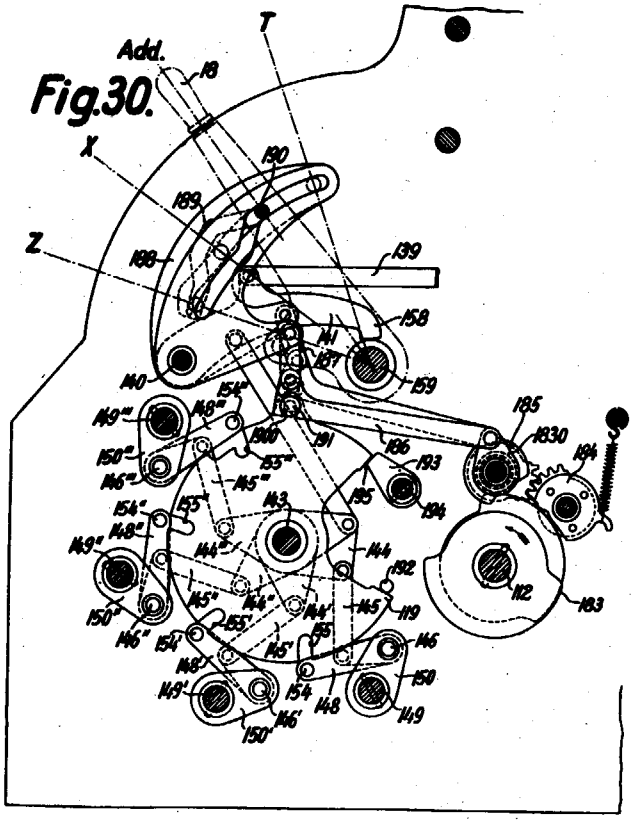
Figure 31:
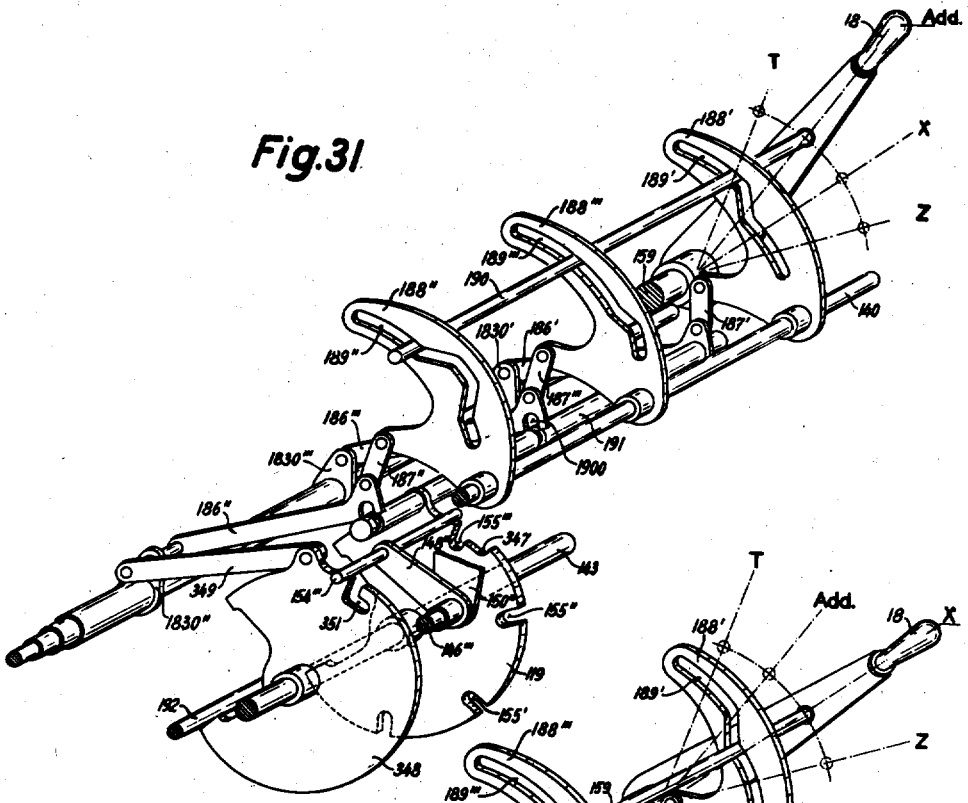
Figure 32:
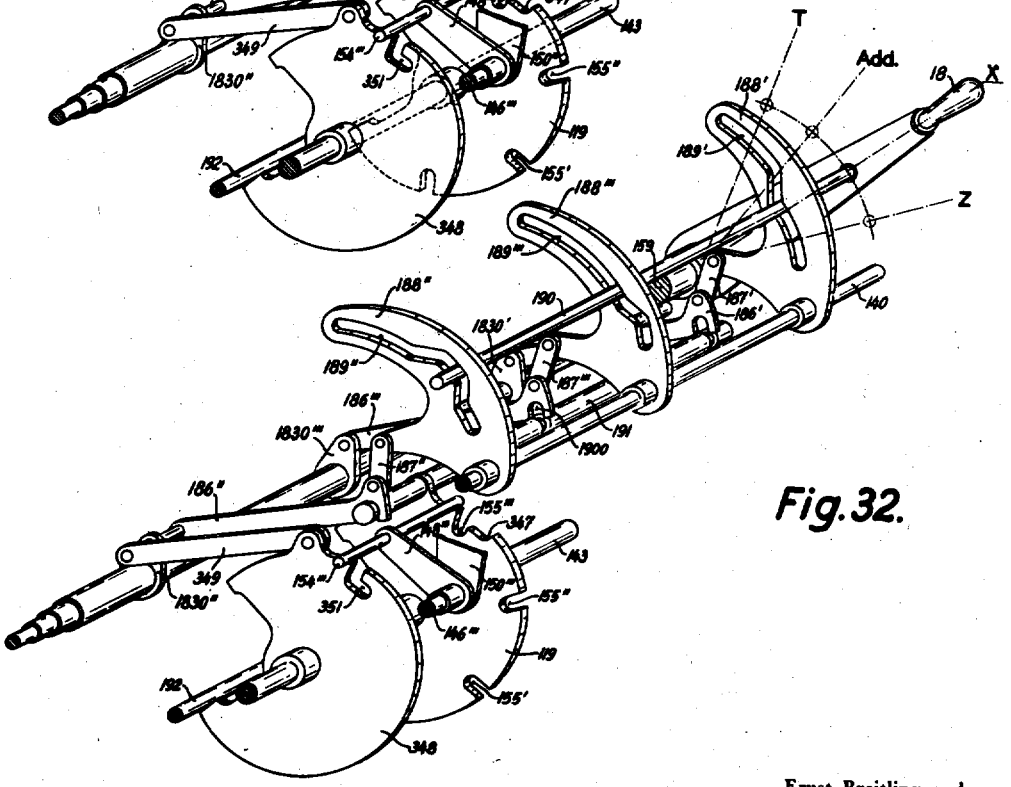

Of said drawings:

Fig. 1 is a top view of the key board of the machine,

Fig. 2 is a side elevation of an amount key bank and the amount differential device cooperating therewith, Fig. 3 is a side elevation of the special key bank and the special differential device cooperating therewith, Fig. 4 is a cross section of the shifting device for special totalizer selection, Fig. 5 shows the shifting device of Fig. 4 evolved, Fig. 6 is a side elevation of another special key bank and of the special differential device cooperating therewith, Figs. 6*a* and 6*b* show a side elevation of the actuating mechanism for the amount and special differential device and a cross section according to line V—V of Fig. 6*a* respectively, whereas Fig. 6*c* is a time diagram for it, Fig. 7 is a top view partly in section of a totalizer shifting device associated with the second special key bank, Fig. 8 is an evolution of the shifting device according to Fig. 7, Fig. 9 is a side view of a transaction key bank and the mechanism controlled thereby positioned for total taking actions, Fig. 10 is a like view as Fig. 9 with the mechanism positioned for adding operations, Fig. 11 is a like view of Fig. 9 with the mechanism positioned for itemizing actions, Fig. 12 is a like view as Fig. 9 with the mechanism positioned for subtotal taking, Fig. 13 is a like view as Fig. 9 with the first special totalizer row to be engaged for adding actions, Fig. 14 is a like view as Fig. 9 with the second totalizer row engaged for itemizing actions, Fig. 15 is a like view as Fig. 9 with the third totalizer row to be engaged for total taking actions, Fig. 16 shows a like view as Fig. 15 with the parts positioned for itemizing actions, Fig. 17 is a side elevation of the transaction key bank and the special differential device allotted thereto, Fig. 18 shows in side view partly in section and Fig. 19 in top view the shifting device of the transaction totalizer row, Fig. 20 is a side elevation of the mode of operation lever and the restoring device for the same, Fig. 21 is a side view of the locking and releasing means of the second special key bank, Fig. 22 is a side view of the transaction key bank and the machine releasing device connected therewith positioned for adding operations before release, Fig. 23 is a side view of the machine releasing device, Fig. 24 is a perspective view of the elements of the different special key banks cooperating with the machine releasing device, Fig. 25 is a like view as Fig. 22 with the machine releasing device positioned after release, Fig. 26 is a like view as Fig. 22 with the machine releasing device positioned in itemizing actions, Fig. 27 is a side elevation of the first special key bank and the elements thereof cooperating with the machine releasing device in the position for adding operations, Fig. 28 is a side elevation of the second special key bank and the elements cooperating with the machine releasing device in subtotal taking actions, Fig. 29 is a like view as Fig. 28 with the parts positioned for total taking actions, Fig. 30 is a side view of the mode of operation lever and the mechanism associated therewith, Fig. 31 is a perspective view of the mechanism associated with the mode of operation lever and positioned with the latter set to "adding", Fig. 32 is a perspective view of the mechanism associated with the mode of operation lever and positioned with the latter set to "subtotal", Fig. 33 is a part cross section of the entire machine according to line I—I of Fig. 17, Fig. 34 is an evolution of the transaction totalizer shifting device, Fig. 35 is a top view of the interlocking device for the totalizer rows selecting means.

*Key board and totalizer arrangement*

The machine according to the invention is provided with several banks of amount keys 11 (Fig. 1), one bank of department keys 12, one bank of preferably insertable clerks' keys divided into two groups 13 and 14, and a bank of transaction keys 15. The transaction keys 15 serve as motor or release keys at single amount entering machine operations. During itemizing actions, however, the transaction key 15 depressed at the beginning of such a transaction remains depressed till total taking. Therefore, a special motor key 16 is arranged for machine release in itemizing operations. Before the commencement of an itemizing operation, a mode of operation or machine conditioning lever 18 having four set positions "add", "itemizing", "read" and "reset" and normally set to "add", has to be adjusted to "itemizing". For multiple-item total taking, a multiple-item total key 17 has to be depressed.

The machine is provided with four totalizer rows (Fig. 2) each row thereof comprising suitably four totalizers of any well known type. Due to this arrangement, the clerk's key bank 13, 14 comprising eight keys, has associated therewith two totalizer rows 19 and 20 (Fig. 2). A department key 12 depressed, selects a totalizer of the row 21. The four totalizer row 22, finally, contains four totalizers one for transactions of "cash" (*) and "paid on account" (R), one for "paid out" (A), one for "charge" (C), and an itemizing totalizer for multiple item transactions. A no sale key "W" is provided in the transaction bank, and, when depressed, causes the itemizing totalizer to be alined with the actuators, but no amounts can be added during a no sale operation because an interlock prevents depression of an amount key and the no sale key for the same operation.

For total taking from any of the special totalizers associated with the various kinds of special keys 12 to 15, the mode of operation lever 18 is to be set to "read" or "reset" whilst the special keys 12 to 15 depressed, serves as motor key at this time as will be described hereinafter.

*Key lockings*

The amount keys are normally locked. They are depressible only after a clerk's key 13 or 14 and a department key 12 has been depressed.

Each amount key bank 11 (Fig. 2) is provided with a detent 40 having sloping surfaces 38 and guided by its straight slots 42 on stationary pins 43 of the key frame 44. The detent 40 is acted upon by a spring 41. When an amount key is depressed, a pin 39 arranged on the stem of it, enters the appropriate slot of the detent and by engaging the surface 38 raises the detent 40 against the action of the spring 41. Each detent 40 has a pin 46 engaging with the machine at rest, an arm 48 fast on a shaft 47.

Fast on the shaft 47 are two further arms 49 (Fig. 21) associated with the clerk's key bank 13, 14 and the department key bank 12 respectively. With the machine at rest, and neither a clerk's key nor a department key depressed, a locking member 50 is in the path of either arm 49 preventing the shaft 47 from being rotated in counter-clockwise direction according to Fig. 21, or in clockwise direction according to Fig. 2. Thus, no amount key 11 can be depressed before the two locking members 50 are moved out of the path of the arms 49 by depressing a department key 12 and a clerk key 13, or 14. As the two locking members 50 are independent of each other, it is of no importance, whether, first, a clerk key and then a department key is depressed, or vice versa. The mechanism for disabling the locking members 50 is shown only in connection with the department key bank. The same mechanism is associated with the clerk's key bank.

A slot 51 of the locking member 50 (Fig. 21) of the department key bank is engaged by a pin 52 of a detent 53 having straight slots 54 guided on stationary pins 55 of the key bank frame 56. The detent 53 has a slot 57 the edge 58 thereof contacting under the action of a spring 59 a pin 60 of a second detent 61 allotted to the department key bank 12. This second detent 61 too has straight slots to be guided on the pins 55 and is held by a spring 62 in normal position. Upon depression of a department key 12, the pin 63 of the depressed key acts upon a bevelled surface 64 of the detent 61 in its appertaining slot and moves the detent downward against the action of the spring 62. At the same time the pin 63 of the depressed department key 12 acts upon a bevelled surface 65 of the detent 53 and moves it upward against the action of the spring 59 till the pin 63 arrives beyond a hook 66. Now, under the action of the tensioned spring 59 the pin 63 of the depressed key 12 engages the hook 66 proper and the latter is held depressed thereby. During the downward movement of the detent 53, which takes place only after the key 12 is fully depressed, the locking arm 50 is counter-clockwisely moved out of the path of the arm 49 and thus rendered ineffective.

In the clerk key bank 13, 14 each time a single key of only one group is depressible. This is obtained by the clerk key bank having allotted thereto two detents 23, 24 (Fig. 3) guided on stationary pins 26 of the key bank frame 27 by their slots 25, and maintained in normal positions by springs 28 and 29 respectively. The detent 23 has bevelled surfaces 31 facing the pins 30 of the stems of the clerk keys 13, and radial slots 32 facing the pins 30 of the clerk keys 14, whereas the pin 30 of a depressed clerk key 14 cooperates with the bevelled surface 33 of the detent 24 and the pin 30 of a depressed key 13 enters a radial slot 34 of the detent 24.

When, for instance, a clerk key 13 has been depressed, its pin 30 acting upon the appropriate bevelled surface 31, has raised against the action of its spring 29 the detent 23. Thereby the radial slots 32 of the detent 23 are moved out of the path of the pins 30 and beneath the pins 30 of the keys 14. Consequently, after a clerk key 13 is depressed, no key 14 can be depressed any more. However, the key 14 is locked also thereby that the pin 30 of the depressed key 13 has entered a radial slot 34 of the detent 24 thereby preventing the detent from being raised by the pin 30 of a key 14 cooperating with a bevelled surface 33. A pin 30 of a key 14 first depressed cooperates with the associated bevelled surface 33, raises the detent 24 against the action of the spring 28, removes the radial slots 34 of this detent out of the path of the pins 30 of the clerk keys 13 and moves arcuate surfaces or solid lugs 36 underneath these pins. Further, the pin 30 of the depressed key 14 enters a radial slot 32 of the detent 23 thereby preventing the detent 23 from being raised by the pin 30 of one of the keys 13 cooperating with the proper bevelled surface 31.

Thus, a key of the group 13 or 14 respectively depressed, can not be released by depressing another one. The detents 23 and 24 are provided with locking surfaces 37 passing underneath the pins 30 of the remaining keys of the respective group when a key thereof is depressed and has raised the pertinent detent 23 or 24.

The transaction keys 15 (Fig. 9) except the no sale key W, are locked against depression, and are released upon depressing an amount key 11. To lock the transaction keys a detent 165 is provided (Fig. 17) having straight slots to be guided on two stationary studs 166 of the key bank frame 72. If no amount key has been depressed, the solid parts or lugs 167 are moved underneath the pins 168 of the keys 15, so that these keys are not depressible. Only the pin 168 of the change key W is opposite a radial slot 169. Thus the change key W can be depressed with no amount key being depressed. The detent 165 has a pin 170 extending into the path of an arm 171 fast on the shaft 47. When, upon depressing an amount key 11 (Fig. 2), the shaft 47 is clockwisely rotated, the arm 171, by means of the pin 170, raises the detent 165 against the action of its spring and removes the lugs 167 from the path of the pins 168 of the four upper transaction keys 15, and the radial slot 169 from the path of the pin 168 of the no sale key W. After an amount key 11 has been depressed, each of the four upper transaction keys is depressible but no more the no sale key W.

*Machine release by transaction keys for single amounts entering actions*

The transaction keys 15 have allotted thereto a detent 67 (Fig. 22) having straight slots 70 to be guided on two stationary studs 71 of the key bank frame 72, and inclined slots 68 to be entered by pins 69 of the transaction keys 15. The detent 67 has a pin 73 engaging a slot of a lever 74. The lever 74 has a second slot 75 to receive a stud 76 of a detent 77. A pin 78 of the left hand arm of the lever 74 engages an inclined slot 79 of an arm 80 rockable on a shaft 81. By means of a sleeve 82 the arm 80 is connected to an arm 83 (Fig. 24) a pin 84 of which is embraced by the bifurcated end 85 of a lever 87. The latter is pivoted on a stud 86 of an arm 88 of a bail 89 pivotal on the shaft 81 and has its other forked end 90 engaged by a pin 91 of an arm 92 rotatable on shaft 81. The arm 92 is connected by means of a tube 93 to a hooked arm 94 extending normally over a projection 95 of an arm 97 pivoted on a stud 96 (Fig. 23). The arm 97 is acted upon by a spring 98 tending to rock the arm in counter-clockwise direction. Such a counter-clockwise rotation is, however, normally prevented by the hooked arm 94.

A surface 99 of the arm 97 is engaged normally by a roller 100 arranged on a vertically extending projection 101 of a pitman 102. The right hand end of the pitman 102 is bifurcated to straddle on the shaft 81, while the left hand end is linked to an arm of a multiple-armed lever 105 pivotal on a stud 104. A strong spring 106 tends to move the pitman 102 to the right, and to rock the lever 105 in clockwise direction, but is normally prevented to do so by the surface 99 of the arm 97. Two arms 107 and 108 of the lever 105 are normally within the path of laterally arranged locking pins 109 and 110 of a disk 111 fast on the drive shaft 112 thus preventing this shaft from rotating.

When, with the parts positioned according to Fig. 22 which corresponds to the adjustment of the mode of operation lever 18 to "add", a transaction key 15 is depressed, the detent 67 is moved downward against the action of its spring 113. Thereat the pin 73 rocks the lever 74 about the pin 76 in clockwise direction. The pin 78 partaking in this rocking movement, and by acting upon the inclined slot 79 rocks the arm 80 in counter-clockwise direction viewed in Fig. 22, and in clockwise direction viewed in Fig. 24. The arm 83 connected to the arm 80 rocks by the lever 87 the arm 92 in counter-clockwise direction (Fig. 24), or in clockwise direction (Fig. 23), respectively, and removes the hooked arm 94 connected thereto against the action of a spring 114 connecting the extension 101 of the pitman 102 with the hooked arm 94, from the path of the extension 95. Now the arm 97 is enabled to rock in counter-clockwise direction under the action of the spring 98, whereby the surface 99 is moved out of the path of the roller 100, and a recess 115 of the arm 97 is moved into the path of the said roller. Consequently the pitman 102 is moved by the spring 106 to the right, and the lever 105 rocked clockwisely. Now the shaft 112 is enabled to be rotated clockwisely. At the end of this rotation the pin 110 arranged on the other side of the disk 111 than the projection 109, acts upon the extension 107 and restores the lever 105 to locking position.

The lever 105 is connected by means of a link 116 to an arm 118 fast on a release shaft 117

(Fig. 13). When the machine is released, the spring 106 rocks the shaft 117 somewhat in counter-clockwise direction.

*Selection of the totalizer rows*

By depressing one key of the special key banks 12, 13, 14, or 15 the totalizer row associated therewith is selected and engaged with a disk 119 (Figs. 13, 14). This engagement is effected by the clerk keys 13 and 14 in the following manner:—

Either detent 23, 24 (Fig. 3) carries a pin 120 embraced by the forked end of an arm 121 of a bail 123 rotatable on a shaft 122, the other arm 124 (Fig. 13) of which bail has arranged thereon a pin 125 engaging the forked end 126 of a lever 128 pivotal on a stud 127. The other arm of the lever 128 is connected by a link 129 to a hooked arm 130 rotatable on the release shaft 117.

Thus, if a key 113 has been depressed, the detent 23 (Fig. 3) is moved upward and the bail 123 as well as the hooked arm 130 by the arm 124 (Fig. 13), the lever 128 and the link 129 are rocked counter-clockwisely, whereat the hook 131 of the arm 13 is moved into the path of an extension 132 of a bell crank 134 pivotal on a stud 133. On a pin 135 of the bell crank 134 a lever 136 is pivoted having the one of its arms connected by a link 137 to an arm 138 fast on the release shaft 117. The other arm of the lever 136 has loosely attached thereto a link 139 linked to an arm 141 rotatable on shaft 140. A link 142 connects the arm 141 with a member 144 rotatable on shaft 143, the said member 144 being connected by a link 145 to an arm 147 rotatable on a cross rod 146. The cross rod 146 is supported by two arms 150, 151 fast on the rock shaft 149 for the clerk's totalizer row 19 (Fig. 2). The arm 151 contacts under the action of a spring 153 a stop 152. The arm 147 is connected by a sleeve to an arm 148 having a pin 154 enabled to enter a notch 155 in the disk 119. With the machine at rest, the release shaft 117 and the arm 138 are in a position according to which the link 137 is prevented from any movement to the right. A spring 156 of the bell crank 134 tends to rock clockwisely the lever 136 about a stud 157 forming the pivot of the link 137 and the lever 136. This rotation, however, can be continued only till the end 158 of the arm 141 contacts a sleeve 160 surmounted on the shaft 159.

As shown in Fig. 14, the key group 14 has allotted thereto a similar linkage to engage the second clerk's totalizer row 20 (Fig. 2) with the disk 119. Corresponding parts are referred to by the same reference numerals with the index'. Fig. 13 shows the linkage in the position it occupies before a key 13 is depressed, and Fig. 14 as positioned after a key 14 has been depressed and the appropriate totalizer row 20 has been engaged with the disk 119 upon releasing the machine for operation. This engaging is effected in the following manner:—

For machine release, the release shaft 117 and the arm 138' fast thereon, are counter-clockwisely rotated to a certain extent whereby the link 137' is moved to the right. As the bell crank 134' is prevented by the hooked arm 130' from rocking in counter-clockwise direction, the pin 135' becomes the pivot for the lever 136'. The lever 136' is rocked counter-clockwisely about the pin 135', rocking by the link 139' the arm 141' and, by the link 142' the bell crank 144' in the same direction, which movement is transmitted by the link 145' to the arms 147' and 148' causing them to rock clockwisely, so that the pin 154' enters the notch 155' in the disk 119. When, with the parts so positioned, the disk 119 is clockwisely rocked, the arm 148' rocks the shaft 149' clockwisely, and the adding wheels on shaft 20 are meshed with the gears differentiated by the amount differentials.

To engage the third totalizer row 21 a similar arrangement is made. The department keys 12 (Fig. 6) have allotted thereto a detent 161 having oblique slots 162 to be entered by the laterally extending pins 163 of the keys 12. The detent 161 has straight slots to be guided on two stationary studs 164 of the key bank frame 56, and a pin 172 embraced by the forked end of an arm 121'' of a bail 123'' rotatable on shaft 122 an arm 124'' (Figs. 15, 16) of which bail moves by the parts 125'' to 129'' the hooked arm 130'' into the path of the extension 132'' of the lever 134'', so that with the release shaft 117 rocking counter-clockwisely the third totalizer row 21 (Fig. 2) is engaged by the parts 136'' to 154'' with the disk 119.

The engagement of the fourth totalizer row 22 (Fig. 2) with the disk 119 (Figs. 15, 16) depends in amount entering operations only upon the depression of an amount key 11. When an amount key 11 has been depressed, a locking pawl 175 of the shaft 47 (Figs. 9 and 10) is moved into the path of an extension 176 of the lever 134''' allotted to the fourth totalizer row. The effect thereof is the same as if the hooked arm 130''' had been moved into the path of the extension 132''', that means, the bell crank 134''' is prevented from being rocked in counter-clockwise direction due to the action of its spring 156''', so that the stud 135''' becomes pivot for the lever 136'''. When the release shaft 117 rotates in counter-clockwise direction, the parts 136''' to 153''' actuate the pin 154''' to enter the notch 155''' of the disk 119 (Figs. 13, 16). Thereby the fourth totalizer row 22 is engaged.

The special totalizers allotted to the clerks and the departments, are provided to accumulate only amounts really cashed in, however, no amount of sale on charge, or amounts paid out. Therefore, when the transaction key "paid out" (A), or "charge" (C) is depressed, the engagement prepared by depressing a clerk key 13, or 14 of the pertinent totalizer row with the disk 119, has to be disabled again. This is effected in that the pivot 127 for the levers 128, 128', and 128'' (Figs. 13, 14, and 15) is arranged on an arm 177 rotatable on the shaft 122 and having an edge 178 bearing against a pin 179 of a detent 180 guided on pins 166 of the transaction key bank frame 72. The detent 180 has only two bevelled edges 181 pertinent to the pins 168 of the paid out and charge keys. Thus, if either of said keys has been depressed, the detent 180 is raised against the action of its spring 182, whereat its pin 179 acts upon the edge 178 of the arm 177 and rocks it in counter-clockwise direction. Consequently, the pin 127 of the arm 177 rocks the levers 128, 128', 128'' in counter-clockwise direction about the appropriate pins 125, 125', or 125'' and by means of the links 129, 129', 129'' the hooked arms 130, 130', 130'' in clockwise direction. Thereby the hooked arm 130, 130', 130'' moved upon depression of an appropriate key into the path of the extensions 132, 132', or 132'', are restored to ineffective position (Fig. 15). Now, when the machine is released and the release shaft 117 rotates counter-clockwisely, the bell cranks 134, 134', 134''. under the action of their springs 156, 156′, and 156″, are allowed to rotate counter-clockwise (Fig. 16), so that the position of the parts 139 to 154, 139′ to 154′ and 139″ to 154″ is not changed, and the three totalizer rows 19, 20, and 21 remain disengaged. The engagement of the totalizer row 22 with the disk 119 is not disabled by depressing the "paid out" or "charge" key, as it is only dependent on the depression of an amount key (Fig. 10).

*Totalizer engagement actuating means*

To actuate the disk 119 (Figs. 30, 31, 32) three actuating arms 1830′, 1830″, 1830‴ are provided according to the three modes of operation "addition", "read" and "reset". In each machine operation the actuating arms 1830′, 1830″, 1830‴ respectively, are driven by means of mutilated gears 184 and 185 actuated by a cam 183 secured to the main shaft 112 and perform equal, but at different time commencing oscillatory movements. Adjacent to the cam disk 183 a second cam disk 1831 is fixed to the main shaft 112. At the commencement of a, say adding machine operation the cam of the cam disk 1831 acting upon the working surface 1840 of the gear 184 locks the gears 184, 185 against the action of the spring 1841 maintaining the engagement of both said gears. When the cam of the cam disk 183 has arrived at the working surface 1850 of the gear 185, the cam of the cam disk 1831 has freed the working surface 1840 of the gear 184, so that the gear 185 and the arm 1830′ is rocked clockwisely (compare Fig. 31).

Each actuator arm 1830′ (1830″, 1830‴ as well) has linked thereto a link 186′ (186″, 186‴) connected by a link 187 to a member 188 pivotal on shaft 140. Like reference numerals only provided with the index ′ and ″ respectively are used in Figs. 31 and 32 for the parts connected with the actuating arms 1830″ and 1830‴. Each of the three members 188 has a cam slot 189 engaged by a pin 190 of the mode of operation lever 18. The cam slots are differently shaped. With the lever 18 set to "add" or "itemizing" a notch 1900 of the link 186′ is located above a pin 191 of the disk 119, whilst the other links 186″ and 186‴ are in raised position (Fig. 31). Thereat the arm 1830′ engages the disk 119 and is oscillated by the cam disk 183 at the time proper for "adding".

When the machine conditioning lever 18 is set to subtotal taking "X" (Fig. 32) the link 186′ is lifted in accordance with the shape of cam slots 189, whereas the link 186″ is brought in engagement with the pin 190 and thus the arm 1830″, appertaining to subtotal taking, with the disk 119. Correspondingly the arm 1830″ engages the disk 119 when the conditioning lever 18 is set to total taking "Z".

Therefrom it can be seen that according to the set position of the lever 18 to "adding", "subtotal X", "total Z" the actuating arm 1830′, 1830″, 1830‴ proper is engaged with the disk 119 which then is rocked at the time proper for the mode of operation by a certain degree in clockwise and then in counterclockwise direction.

When in rest position, the disk 119 bears against a stationary stop pin 192. With the machine at rest the disk 119 is prevented by a cam 193 fast on shaft 194 from being displaced, the said cam being moved out of the path of the surface 195 of the disk 119 immediately at the beginning of the machine operation, and restored to its effective position only at the end of it when the disk 119 is again in rest position.

*Amount differentials*

Each amount key bank 11 (Fig. 2) has associated thereto a differential device. Each amount differential consists of an actuator 196 rocked to a certain extent in each machine operation by the medium of an intermittent oscillatory drive of a type shown in Figs. 6*a* to 6*c*, actuated by the main shaft 112. All the actuators 196 are fast on a tube 197 surmounted on the shaft 159. The actuator 196 is engaged by a latch 198 pivotal on a carrier 199 rotatable on the tube 197. The carrier 199 is connected by a spring 200 to a setting member 201 arrested in an adding action either by a zero stop pawl 202 or by the foot of the depressed key 11. A pin 204 of the latch 198 is guided in an inclined slot 203 of the setting member 201. When the setting member 201 is arrested, the actuator 196 continues its movement and, by the latch 198, also the carrier 199, first in clockwise direction against the action of the spring 200. Thereat the pin 204 travels in the inclined slot 203 whereby the latch 198 is disengaged from the actuator 196 and moved into engagement with a notch 205 of a locking plate 206.

By the differential device differentiated, the amount set up on the amount key board is transferred also to the indicating carriers 450 and the type carriers 460 of the printer, arranged on nested tubes. For this purpose, the latch carrier 199 has pivotally mounted thereon an arcuate arm 207 having its other end linked by a beam 208 to a gear 209 rotatable on shaft 210. From this gear 209 the setting of the respective type carrier 450 and indicating carrier 460 is derived. To move said type and indicating carriers by the shortest distance out of the previous position into the new one, an arcuate surface 211 of the arm 207 is forced, while the amount differential device is set, to contact the hub of the actuator 196. This is effected by an arm 214 rotatable on the main shaft 112, the said arm having a roller 212 rocked counter-clockwisely against the action of its spring 217 to engage with the arm 207 by a cam 215 fast on shaft 213 acting upon a second roller 216 of the arm 214. This is shown and described in detail in a copending application wherefore only a brief description is given herein.

After the actuators 196 have finished their clockwise rotation, the gears 209, before the said actuators start to return to rest position in counter-clockwise direction, are latched by a locking device not shown. Further, at this time, in an adding operation, the adding wheels 218 of the selected totalizer are meshed with the respective gears 219, each one thereof being in mesh, through an intermediate wheel 220 rotatable on shaft 143, with the toothed segment 221 of the setting member 201.

When the actuator 196 returns in counter-clockwise direction to rest position, it carries along by means of a pin 222 the pawl carrier 199, and through a second pin 223 the setting member 201, by which during this retro-movement the engaged adding wheels are advanced by the amount set up.

To prevent the latch 198 from being disabled unintentionally, which, for instance, due to the inertia of the setting member 201, would be due to the initial acceleration of the differential device, a brake disk 224 on the tube 197 is provided having a slot 225 oppositely inclined to that of the slot 203 of the differential member 201 which slot 225 is also engaged by the pin 204 of the latch 198. For a more detailed description reference may be had to the above named copending application.

*Special differential devices*

The special key banks 13, 14, 12, and 15 have also allotted thereto differential devices similar to the amount differentials. The particular function of these special differential devices in addition to setting the respective indicating 450' and the type carriers 460', is to select the desired totalizer of the proper totalizer row according to the special key depressed. The selection is effected by shifting transversely the entire totalizer row till the wheels, interspersed in the single denominational orders, of the totalizer proper face the amount differentials. The setting members 201 of the special differentials have no toothed segments 221 as the amount differentials, since by them no adding wheels have to be advanced. To shift the totalizer row, auxiliary setting members 236 (see f. i. Fig. 17) are pivotally mounted on shaft 159. Every auxiliary member 236 has a slot 237 embracing the pivot 238 joining the arm 207 and the beam 208 connected to the indicating and printing devices. Otherwise than in connection with the amount differentials, the actuators 196 for the special differentials are directly secured to the shaft 159. The shaft 159 is driven otherwise than the tube 197 having fastened thereon the actuators 196 for the amount differentials. Thus amount and special differentials are timed differently in such a way that setting of the special differential devices and thus the totalizer selection has already been accomplished before the setting movement of the amount differentials is started. This is effected by mechanism shown in Figs. 6*a*, 6*b*, and 6*c*.

At the right of the partition 458 two locking disks 461, 463 and two toothed segments 462, 464 are secured to the main shaft 112 to which in every machine operation a counter-clockwise revolution is imparted. The segment 462 is faced by a gear 465 mounted upon a stud 472 and rigidly connected to a toothed segment 466 cooperating with a locking disk 461. A gear 467 fixed to the gear 465 is in permanent mesh with a gear 468 attached to a stub shaft 471 and rigidly connected with a gear 469 and a toothed segment 470 which is cooperating with the toothed segment 464 and the locking disk 463 respectively.

The locking disks 461 and 463 normally lock the train of gearing in the position shown. Shortly after the commencement of the counter-clockwise rotation of the main shaft 112 the first tooth of the segment 462 enters into the toothing of the gear 465. As the locking lugs 461' and 463' of the disks 461 and 463 have been moved out of the path of the segments 466 and 470, the train of gears 465 to 467 is rotated in clockwise direction by the segment 462, till both segments 466 and 470 are again locked by the lugs 461'' and 463'' of the disks 461 and 463 respectively. The first rotation of the gear 467 in clockwise direction is designated in the time diagram, Fig. 6*c* "First oscillatory movement" (467).

During the further rotation of the main shaft 112 the locking lugs 461'' and 463'' free the cut away portions 466' and 470' of the segments 466 and 470 and the first tooth of the segment 464 enters into the toothing of the gear 469 which is thus rotated by the segment 464 in clockwise direction till the lugs 461' and 463' of the disks 461 and 463 contact the cut away portions 466' and 470' of the segments 466 and 470 and lock them against any rotation. The clockwise rotation of the gear 469 is transferred by the gear 468 to the gear 467, which is moved thus in counter-clockwise direction. This counter-clockwise rotation of the gear 467 is marked in the time diagram Fig. 6*c* "Second oscillatory movement".

The gear 467 meshes permanently with a pinion 475 mounted upon a stud 474 and rigidly connected with two toothed segments 476, 478 and two locking disks 477, 479 (Figs. 6*a* and 6*b*). The segment 476 is faced by a toothed segment 481 and the disk 477 by a toothed segment 482 provided with two cut away portions or recesses 482' and 482''. The two segments 481 and 482 are rigidly connected to each other and secured to the shaft 159, which supports the actuating members 196 of the special and transaction key banks. In like manner a toothed segment 484 is arranged oppositely to the segment 478 and a locking disk 479 to a toothed segment 485 provided with two recesses 485' and 485''. The segments 484 and 485 are also fixed to each other and secured to the tube 197 connected to the actuating members 196 of the amount differentials as mentioned already.

When the gear 467 is performing its first clockwise rotation the train of gearing 476 to 479 is rocked in counter-clockwise direction. The segments 481, 482 and 484, 485 respectively are locked at the first, as the locking surfaces of the disks 477 and 479 engage with the recesses 482' and 485' of the segments 482 and 485. Shortly after commencement of the rotation the first tooth of the segment 476 meets a tooth of the segment 481 whilst simultaneously the disk 477 frees the recess 482' of the disk 482 thus permitting the gear 476 to rotate the segments 481, 482 by certain degrees in clockwise direction until the disk 477 engages the recess 482'' of the segment 482 and locks the segments 481, 482. The segments 481, 482 rotate by the shaft 159 the actuating member 196' of the special differentials, which effect selection of the totalizer in the manner already set forth. This portion of the driving movement is named "totalizer selection" in diagram Fig. 6*c*.

During the further clockwise rotation of the gear 467 and the counter-clockwise rotation of the train 475 to 479 respectively, the disk 477 is locking the segments 481, 482 whilst the disk 479 disengages with the segments 484, 485, which are rotated clockwisely by the segment 478 till the disk 479 engages the second recess 485'' of the segment 485 and locks also the segments 484, 485. The segments 484, 485 when clockwisely rotating actuate by the tube 197 the actuating members 196 of the amount differentials which are differential thereat according to the value of the amount keys depressed in adding operations and according to the total standing on a totalizer during total taking. That portion of the driving movement is marked "resetting" in the diagram Fig. 6*c*. Thus it can be seen, that the first oscillatory movement of the gear 467 in clockwise direction is transformed into a clockwise rotation of the shaft 159 and into a subsequent clockwise rotation of the tube 197.

When the gear 467 is performing its second or counter-clockwise rotation, the train 475 to 479 is clockwisely returned, whereat in reverse sequence as before, first by the segments 478, 484, 485 and the tube 197 the actuating members 196 of the amount differentials and then by the segments 476, 481, 482 and the shaft 159 the actuating members 196′ of the differentials are moved into their respective rest positions. During the retromovement of the amount differentials, which is named "adding" in diagram Fig. 6c, the amount set up is entered into the totalizers. Subsequently the special differentials are also moved into rest position.

As the clerk key bank 13, 14 has associated thereto two totalizer rows, both said rows have to be shifted by the single appropriate differential device. The toothed segment 239′ (Fig. 3) of the setting member 236′ of the special differential device allotted to key bank 13, 14, meshes with a gear 226 rotatably mounted on shaft 143. The gear 226 is connected to a gear 227 meshing by an intermediate gear 228 (see also Fig. 4) rotatable on shaft 149, with teeth 229 of a drum 231 rotatably mounted on shaft 230. The drum 231 is secured against lateral shifting by means of set collars 232 and has two cam grooves 233 and 234 (see also Fig. 5). The cam groove 233 is engaged by the roller 235 of an arm 240 shiftably arranged on the drum 231, provided with a bifurcated end to fit the annular groove 241 of a tube 242 shiftable on shaft 149. The tube 242 is connected to the shaft 19 having attached thereto the supporting arms 243 of the totalizer frame. The cam groove 234 is engaged by a roller 244 of an arm 245 to be shifted by the drum 231 on a shaft 246. The arm 245 has a groove 247 engaged by an extension 248 of the one supporting arm 249 for the totalizer shaft 20. The cam grooves 233 and 234 are so formed (Fig. 5) that at a time only one shaft is shifted. When, for instance, the totalizer assigned to clerk No. 7 is selected, the totalizer No. 4 remains also in the plane of the amount differential devices. This, however, is without effect, since the totalizer row comprising totalizer No. 4 is not engaged with the disk 119 when the key "7" has been depressed, and, hence, no totalizer thereof is enabled to be engaged with the amount differential devices.

The special differential device (Fig. 6) associated with the department keys 12, and the pertaining totalizer selecting device corresponds essentially to the one of the clerks' keys besides that the drum 231″ controlled by the proper auxiliary member 236″ of the special differential device by the medium of the parts 226″ to 229″, has only one cam groove 233″ (Figs. 7 and 8) engaged by the roller 235″ of the one arm 240″ connected to the totalizer row 21 (Fig. 6).

The fourth totalizer row 22 associated with the transaction key bank 15 comprises three transaction totalizers and the itemizing totalizer. The shifting is controlled by the depressed transaction key 15 as well as by it in combination with the mode of operation lever 18. Normally, the totalizer row is shifted for totalizer selection, under control of the depressed transaction key 15, by the auxiliary member 236 (Figs. 17 and 33) through the medium of gears 226‴ to 228‴ and a gear 250 on shaft 230‴, said gear being connected by means of a sleeve 251 of a bevel gear 252. The bevel gear 252 is in mesh with a bevel pinion 253 mounted upon a stud 254 of a bail 255 pivotal on shaft 230‴. The bevel pinion 253, in its turn, meshes with a bevel gear 256 fast on shaft 230‴. Further, the shaft 230‴ has secured thereto a shift drum 231‴ having a cam groove 233‴ for guiding a roller 235‴ (Fig. 19) of an arm 240‴ shiftable on the drum 231‴. The bifurcated arm 240‴ engages an annular groove 241‴ of a tube 242‴ (Figs. 18, 31) shiftably arranged on shaft 149‴ and connected to a supporting arm 243‴ for the totalizer shaft 22. To enable the supporting arms 243‴ and the totalizer row 22 to partake in the rotation of the shaft 149‴, the tubes 242‴ connected to the supporting arms 243‴ have extensions to be guided on extensions of a tube 257 fast to shaft 149‴.

A sleeve 258 connects the mode of operation lever 18 with a segment 259 (Fig. 33) which is toothed only at one end thereof (Fig. 20). The other arcuate surface 260 of the segment 259 cooperates with two locking teeth 261 of a segment 262 pivotal on shaft 143. A toothed segment 263 connected to segment 262, meshes with an intermediate segment 264 rotatable on shaft 149‴ which latter segment meshes in its turn with a toothed segment 265 connected to the bail 255.

With the mode of operation lever 18 set to "add", or "read", or "reset" the arcuate surface 260 cooperating with the locking teeth 261, locks the segment 262 and the parts connected therewith, that means, also the bail 255. With the mode of operation lever 18 adjusted as above referred to, the desired totalizer is selected only by the special differential device allotted to key bank 15. The rotation of the auxiliary member 236 (Fig. 17) is transferred by the gears 226‴ to 228‴ to the gear 250, and by the bevel gearing 252 to 256 (Fig. 33) to the shaft 230‴. The drum 231‴ shifts by means of the groove 233‴ and the roller 235‴ the totalizer row 22 and positions thereat the adding wheels of the desired totalizer into the planes of the amount differentials.

When, however, the mode of operation lever 18 is adjusted from its "add" position to "itemizing" position, the toothing 266 of the segment 259 (Fig. 20) meshes with the toothing 267 of the segment 262. Consequently the segments 262 and 263 as well as the segment 265 and the bail 255 (Fig. 20) are rocked in counter-clockwise direction. As the mode of operation lever 18 is adjusted to "itemizing" with the machine at rest, also the special differential device of the special key bank 15, and in connection therewith, the bevel gear 252 are at rest. When the bail 255 is rocking, the bevel pinion 253 rolls onto the bevel gear 252 and rotates thereat the bevel gear 256 and the shaft 230‴. The gear ratios of the gears connecting the lever 18 to drum 231 are such that, by moving the mode of operation lever 18 from "add" position to "itemizing" position, the drum 231‴ is rotated four steps. To this direct rotation caused by the adjustment of the lever 18 will be added the rotation effected during the machine operation by the special differential device in accordance with the transaction key 15 depressed in entering an item of a multiple-item transaction. The cam groove 233‴ is so shaped that the total rotation of the drum 231‴, resulting from the adjustment of the mode of operation lever 18 and of the special differential device moves the roller 235‴ into the cam groove portion 233‴*a* (Fig. 34). This cam groove portion 233‴*a* corresponds to the itemizing totalizer selection and engagement respectively. Each item of a multiple-item transaction is thus entered into the itemizer.

*Machine release in multiple-item transactions*

By setting the mode of operation lever 18 to "itemizing", the transaction keys 15 are disabled to function as release keys, so that during an itemizing operation the motor key 16 has to be depressed.

The shaft 159 has rotatably mounted thereon a toothed segment arm 268 (Fig. 20) connected by means of a sleeve to the mode of operation lever 18. The segment 268 meshes with a gear 273 fast on shaft 272. The shaft 272 has secured thereto an arm 276 (Figs. 22 and 25) connected by means of a link 277 to a member 279 pivotal on shaft 278. The member 279 has a curved slot 280 guiding a pin 281 of the detent 77. With the mode of operation lever 18 set to "add", the pin 76 of the detent 77 is in the upper portion of the recess 75 of the lever 74, so that upon depressing a transaction key 15, as set forth already hereinbefore, the lever 74 is rocked clockwisely about this pin to release the machine (Fig. 25). When, however, the mode of operation lever 18 is adjusted to "itemizing", the shaft 272 with the arm 276 and by the link 277, also the lever 279 are clockwisely rotated and positioned as shown in Fig. 26. At this time the curved slot 280 causes the pin 281 to move the detent 77 downward, so that the pin 76 leaves the upper portion of the recess 75 of the lever 74. When, now, a transaction key is depressed, the lever 74 is rocked clockwisely about the stud 78 (Fig. 26), but this movement does not release the machine for operation.

Normally, the motor key 16 is locked against depression by a pawl 283 locking its pin 282 (Fig. 17). The pawl 283 is pivotal on a stationary pin 284 and has a recess 285 embracing a pin 286 of an arm 287 pivotal on shaft 278. A sleeve 288 connects the arm 287 to an arm 325 (Fig. 20) counter-clockwisely rocked by a pin 336 secured to the mode of operation lever 18 when the latter is moved to "itemizing". Thereby the locking pawl 283 is removed in clockwise direction from the path of the pin 282, so that the motor key 16 is free to be depressed.

The motor key 16 has allotted thereto a detent 289 (Fig. 22) either end thereof having a slot to be guided on pins 71 and 290. The lower end of the detent 289 has attached thereto the spring 113 for the detent 67. A link 292 connects the pin 78 of the lever 74 with the detent 289. The pin 291 of the motor key 16 is faced by a sloping edge 293 of the detent 289. When the motor key 16 is depressed, the pin 291 cooperating with the sloping edge 293, raises the detent 289 and the link 292 against the tension of the spring 113. Thereat the pin 78 is moved upward within the inclined slot 79 of the lever 80, thereby rocking the arm 80 counter-clockwisely and thus releasing the machine for operation.

In order to provide for the transaction key 15, the clerk key 13, or 14, and the department key 12 to remain depressed during the whole multiple-item transaction, the following arrangement is made:

When single amounts are entered, the special keys depressed are released at the end of the machine operation by a key release shaft 301 (Fig. 21) driven uniformly during each machine operation. This release shaft 301 has secured thereto within the reach of the transaction, clerk and department key bank an arm 302 carrying a pawl 303. Under the action of a spring 304, the pawl 303 engages a pin 307 of a bell crank 306 pivotal on a stationary stud 305. The one arm of the bell crank 306 has a slot embracing a pin 309 of a detent 312 guided on stationary studs 311, the upper end of the said detent having pivoted thereon a itman 418 guided on shaft 272. Under the action of the spring 304 a roller 416 carried by the pitman 418 bears against the circumference of a cam disk 417 fast on shaft 272. When the mode of operation lever 18 is set to "add", "total", or "subtotal", the portion of greater diameter of the cam disk 417 is acting upon the roller 416. Thereby the edge 313 of the pawl 303 is kept in the path of a square pin 314 of the detent 53, against the action of the spring 304. When, at the end of a machine operation, the release shaft 301 rotates clockwisely, its pawl 303 raises the detent 53, so that the depressed special key is free to return to normal position. With the mode of operation lever 18 positioned to "itemizing", a portion of smaller diameter of the cam disk 417 is facing the roller 416. Consequently, the pawl 303 is enabled to rock in counter-clockwise direction due to the action of the spring 304 whereby its edge 313 is moved out of the path of the square pin 314. Thus, the release shaft 301 rotates idly without releasing the special keys.

*Multiple item total taking*

By resetting the itemizing totalizer the multiple item total is transferred during the same machine operation to the totalizer of the fourth totalizer row 22 corresponding to the depressed transaction key 15. Selecting this totalizer after resetting the itemizing totalizer is effected by the mode of operation lever 18 being automatically restored to "add".

A restoring arm 318 (Fig. 20) is pivoted on shaft 159, having a toothed segment 319 meshing with a toothed segment 320 of a bell crank lever 322 pivotal on a stud 321. The bell crank 322 has mounted on its other end a roller 323 engaging by the action of a spring 325 with the circumference of a cam disk 324 fast on the main shaft 112.

The restoring arm 318 has pivoted thereon a pawl 326 having a roller 327 contacting by the action of a spring 328 an arcuate edge 329 of a plate member 332 having straight slots 330 to be guided on stationary pins 331. A pin 333 of the plate 332 extends into the slot of an arm 334 fast on a stud 310. Normally, the plate 332 is in its upper position shown in Fig. 20. With the parts so positioned the pawl 326 is out of the path of a pin 337 of the mode of operation lever 18. Thus, the rocking movement of the restoring arm 318 does not affect the mode of operation lever 18.

In entering single amounts or taking multiple-item totals, the shaft 310 is given a rotation in counter-clockwise direction in any manner well known in the art and therefore not detailed herein, so that the plate 332 is moved downward by the arm 334. Thereat the arcuate edge 329 rocks the pawl 326 in clockwise direction and moves its edge 338 into the path of the pin 337. The restoring arm 318 rocks to such an extent that the edge 338 at a full stroke becomes positioned as shown in Fig. 20 in dashed-dotted lines, faintly contacting the pin 337. Thus, when single amounts are entered, with the machine conditioning lever 18 in "add" position, the restoring arm 318 is not operative. When, however, the mode of operation lever 18 is adjusted to "itemizing", the pin 337 acts upon a sloping edge 339 of a locking pawl 341 pivotal on a stationary pin 340, and forces said pawl aside till its hook, under the action of a spring 342 engages from behind the pin 337 of the machine conditioning lever 18 thus preventing the lever 18 from being moved out of the itemizing position into add position till the multiple-item total is taken. A projection 343 of the locking pawl 341 extends into the path of a pin 344 on the plate 332. When items of a multiple-item transaction are entered, the shaft 310 is not rotated by the known mechanism and, consequently, the plate 332 is not moved downward. The mode of operation lever 18 is therefore not enabled to be restored to add position during multiple-item entering actions. Further, during said multiple-item action, the edge 338 remains out of the path of the pin 337. When, however, the multiple-item total is taken by depressing the key 17 the shaft 310, as already mentioned, is counter-clockwisely rotated and the plate 332 moved downward. Thereat by the action of the pin 344 upon the projection 343, the pawl 341 is moved out of the path of the pin 337, and, by the arcuate edge 329 acting upon the roller 327, the front edge 338 of the pawl 326 is moved into the path of the pin 337. When, now, after nearly half a cycle of the main shaft 112, the restoring arm 318 is rocked in counter-clockwise direction, the edge 338 strikes the pin 337 and thereby restores the lever 18 to add position.

By the restoring movement of the machine conditioning lever 18 the adding wheels of the itemizing totalizer are moved out of the planes of the amount differentials, and, instead thereof, the totalizer of the same row corresponding to the depressed transaction key 15, is placed opposite the amount differentials. When items belonging to a multiple-item transaction are entered, the roller 235''' (Fig. 33) is, as mentioned already, in the portion 233'''*a* of the curved slot 233'''. By restoring lever 18 to add position, the drum 231''' is returned by four steps, whereby the roller 235''' is removed from the portion 233'''*a*. Now, only the setting of the drum 231''' caused by the depressed transaction key and transferred to it by the special differential device (Fig. 17) is effective.

To fully understand the function of the restoring arm 318 it has to be kept in mind that by the cam disk 324 the restoring arm 318 is rocked in counter-clockwise direction after about half a cycle of the said disk, and restored to normal at the end of the main shaft revolution. The functions of the disk 324 are to rock the bell crank 322 as well as to prevent a too great acceleration at the start of the machine operation. For this reason the radius of the disk 324 grows gradually, so that during the first half cycle of the shaft 324 the strong spring 325 is somewhat tensioned. At the end of the rotation of the main shaft 112, the roller 323 cooperates with a sloping surface 3240. Since the circuit of the motor is broken before the cam disk 324 has regained its normal position, restoring the main shaft 112 to normal position is secured in each instance by means of the roller 323 cooperating with the sloping surface 3240 due to the action of the tensioned spring 325.

*Engagement of the transaction totalizer row during multiple-item total taking*

As set forth already, the engagement of the totalizer row 22 with the disk 119 in adding operations is controlled by an amount key depressed. As in multiple-item total taking operations no amount keys are depressed, the locking arm 175 (Fig. 11) remains in its ineffective position. The bell crank 134''' allotted to the totalizer row 22, has a square pin 345 (Fig. 11) cooperating with the circumference of a cam disk 346 fast on the shaft 212. By setting the lever 18 to "itemizing" the shaft 212 is so rotated that a cam of the disk 346 faces the pin 345. With the machine at rest, the square pin 345 is distanced to a certain extent from the cam of the disk 346 (Fig. 10). When, now, by starting machine operation, the release shaft 117 is rotated in counter-clockwise direction, the bell crank 134''' is free to rock also in counter-clockwise direction due to its spring 156''', till the square pin 345 encounters the cam of the disk 346 (Fig. 11). During the continued rotation of the release shaft 117, the arm 138''' and the rod 137''' rock the lever 136''' about the pin 135'''' in counter-clockwise direction, and the parts 139''', 141''', 142''', 144''', 145''', and 147''' rock the arm 148''' in clockwise direction. However, the arm 148''' is not rocked to such an extent as when the bell crank 134''' had been prevented from any rotation at all. Consequently, the pin 154''' is prevented from entering the notch 155''' of the disk 119 (Figs. 15 and 16), but it remains only within the reach of a recess 347 of the disk 119, said recess being so dimensioned that the disk 119 can not act upon the pin 154'''. Engaging the fourth totalizer row 22 is effected by a second disk 348 (Fig. 11) also rotatably mounted on shaft 143 and connected by a link 349 to an actuating arm 1830'' which is constantly operated by the main shaft 112 for subtotal taking as above described in connection with Figs. 30, 31, and 32. The disk 348 has an L-shaped slot 351 to be entered by the pin 154''' of the arm 148'''. When the arm 148''' is so far rocked in clockwise direction that its pin 154''' enters the recess 155''' of the disk 119 (Figs. 15, 16, 31, 32), the said pin comes at the same time within a more horizontal portion of the slot 351 (Fig. 12). This portion of the slot slides ineffectively over the pin 154''' when the disk 348 is moving. With the arm 148''', rocking to a minor extent, and thus its pin 154''' remaining within the recess 347 of the disk 119 (Figs. 15, 16), the pin 154''' is in the more vertical portion of the slot 351 of the disk 348 (Fig. 11). Consequently, the totalizer row 22 is engaged by means of the disk 348 with the amount differentials in a manner suited for subtotal taking. After the itemizing totalizer is reset, the fourth totalizer row is temporarily disengaged, during which interval the totalizer row 22 is shifted by the lever 18 when restored. Thereupon the totalizer row is again engaged and the total taken from the itemizer is entered by the differential into the transaction totalizer selected by the transaction key depressed.

*Preventing engagement of the clerks' and department totalizers in multiple-item total taking*

For entering items of a multiple-item transaction, the totalizers corresponding to the depressed clerk and department keys, are engaged with the amount differentials. In spite of the fact that these keys remain depressed also during the item total taking operation, the clerk's and department totalizers have to be disengaged from the amount differential during that action. This is effected by the itemizing key 17 depressed (Figs. 1 and 6). Depressing the itemizing key 17 is normally prevented by a locking lug 353, positioned underneath a pin 352 of the said key 17, of a detent 354 guided on pins 164. The lug 353 can be moved into ineffective position only with the machine conditioning lever 18 set to "itemizing" and with no amount key depressed, as shown in Fig. 6. A pin 355 of the detent 354 has pivoted thereon a lever 356 having its upper recess engaged by a pin 357 of a bell crank 358 pivotal on shaft 122. The other arm of the bell crank 358 has linked thereto a pitman 359 having a pin 360 guided in a cam groove 361 of a disk 362 fast on the release shaft 272. The lower recess of the lever 356 is engaged by a pin 363 of an arm 364 fast on shaft 47. The lug 353 of the detent 354 is, thus, in ineffective position. If the operator, with the lever 18 set to "itemizing", and the key 17 depressed, would try to depress an amount key, the shaft 47 (see Fig. 2) and in connection therewith the arm 364 would be rocked clockwisely. Thereat the pin 363 would rock the lever 356 about the pin 357 in counter-clockwise direction and raise the detent 354, whereby the lug 353 would come underneath the pin 352. The same would occur, when the lever 18 would be moved out of itemizing position. Of course, the lug 353 remains even then still in the reach of the pin 352 when the lever 18 is removed from itemizing position and an amount key is depressed as well.

Assume, the parts are positioned as shown in Fig. 6. By depressing the itemizing key 17 its pin 352 entering an inclined slot 356 of a detent 366 guided on pins 164 raises said detent. A pin 367 of the detent 366 engages a recess in an arm 368 pivotal on shaft 122, the said arm being connected by a bail 369 to an arm 370 (Fig. 15). When the arm 370 is rocking counter-clockwisely, its pin 371 encounters the edge 178 of the arm 177, and rocks the pivot 127 in the same manner as it were done when one of the keys "paid out", or "charge" had been depressed. As a consequence, the hooked arms 130, 130' and 130'' are moved out of the path of the respective projections 132, 132' and 132'', so that none of the associated totalizer rows 19, 20, and 21 can be engaged with the disk 119.

By restoring the lever 18 to "add" position during multiple-item total taking, also the disks 417 are positioned as shown in Fig. 21 and, due thereto, the pawls 303 moved within the reach of the pertinent square pins 314, so that at the end of such a machine operation all the depressed special keys are released.

*Adjusting the special type wheel associated with the mode of operation lever*

To adjust a special type carrier 460'' according to the respective position of the machine conditioning lever 18, the shaft 159 has pivotally mounted thereon another segment arm 268' (Fig. 20) having a slot for guiding a sliding block 270 of an arm 271 pivoted to the machine conditioning lever 18. The toothing of the segment arm 268' meshes with a gear 273' rotatable on shaft 272, adjusting the special type carrier 460'' by means shown in Fig. 20. When the lever 18 is adjusted to "itemizing", the arm 271 functions as a rigid connection between the lever 18 and the segment arm 268'. Upon adjusting the lever 18 to "read" or "reset", the outer arcuate edge 419 of the arm 271 comes into contact with a stationary roller 420 preventing the inward arcuate edge 275 of the arm 271 from leaving the hub of the lever 18. Consequently, also in this instance, the segment arm 268' is set according to the position of the lever 18.

However, the segment arm 268' has to be prevented from taking part in the automatic restoration of the lever 18 from the itemizing into the add position at the end of a multiple-item transaction. The special type carrier 460'' set by the segment arm 268' is locked before and during the printing action as it is the case with all the other type carriers too. This locking becomes effective when the lever 18 is automatically restored. By this locking all the other transfer parts including the segment arm 268', being in positive connection with the special type carriers 460'', are locked against rotation. Due to the arm 271, upon restoring the lever 18, however, the sliding block 270 travels within the slot 269 to the right, so that the segment arm 268' and the parts connected therewith are not affected thereby.

When a multiple-item total taking action is followed by an adding operation, the special type carrier 460'' has to be returned to add position at the beginning of the next machine operation. This is effected by a cam 274 fast on the shaft 194. The shaft 194 performs, as mentioned, a counter-clockwise part rotation at the beginning of each machine operation. By the mode of operation lever 18 automatically restored from "itemizing" position into the "add" position the inward arcuate surface 275 of the arm 271 is moved away from the hub of the mode of operation lever 18, so that the outer arcuate edge 419 comes into the reach of the cam 274. In this position the parts are maintained also after the multiple-item total taking action is finished. When, now, subsequently, the machine is conditioned for adding, that means, for entering a single amount, the cam 274, at the beginning of the machine operation, strikes the outer arcuate surface 419 and moves the inward arcuate surface 275 into contact with the hub of the lever 18. Thereby the segment arm 268' and the parts connected therewith, are positioned in accordance with the adjustment of the lever 18.

*Total or subtotal taking from the transaction and the special totalizers*

As set forth already, the totalizer row 22 is engaged under control of the pawl 175 (Fig. 10) secured to shaft 47 and of the disk 119 for entering single items of a multiple-item transaction, and under control of the disks 346 (Fig. 11) and disk 348 for item total taking. Engagement of the totalizer row with the disk 119 is controlled by the hooked arm 130''' (Figs. 9 to 12) for total or subtotal taking from one of the totalizers of this row. The hooked arm 130''' is pivoted on the release shaft 117 and connected by means of a link 129''' to a lever 128''' pivotal on stud 372, the bifurcated end 126''' of said lever embracing a pin 125''' arranged on an arm 124''' pivotal on shaft 122. The arm 124''' is connected by a sleeve to an arm 121''' provided with a recess to receive a pin 120''' of a detent 173 of the transaction key bank guided on stationary pins 166. The detent 173 is provided with inclined slots facing the pins 168 of the transaction keys "cash", "paid on account", "paid out" and "charge", and a radially directed slot 373 for the pin of the "no sale" key W.

The pivot 372 for the lever 128''' (Fig. 10) is arranged on the lever 374 pivotal on shaft 133. The roller 375 of said lever 374 is cooperating with the circumference of a disk 376''' fast on the release shaft 272. When the lever 18 is set to "add", or "itemizing", the roller 375 engages a portion of greater diameter of the disk 376''' (Figs. 10, 11). By depressing one of the transaction keys 15 (except the "no sale" key W) with the parts so positioned, the detent 173 raised, the members 120''', 121''', 124''', 125''', 128''', and 129''' rock the hooked arm 130''' counter-clockwisely. This rocking movement, however, is not sufficient to move the hook 131''' into the path of the projection 132''' of the pertinent bell crank 134'''. Thus the movement caused by the depression of a transaction key 15 does not effect engagement of the totalizer row 22 with the disk 119. However, upon adjusting the lever 18 to total or subtotal taking, a portion of lesser diameter of the disk 376''' faces the roller 375. Due thereto the lever 374 is able to rock in counter-clockwise direction, and the pivot 372 to travel to the left (Fig. 12). With the parts so positioned and a transaction key 15 (except the "no sale" key W) depressed, by the counter-clockwise rocking of the hooked arm 130''' effected thereby, the hook 131''' is moved into the path of the projection 132''' of the bell crank 134'''. Due thereto the totalizer shaft 22 is engaged with the disk 119 during and by the machine operation now started.

To prevent totalizer rows 19, 20, and 21 from being engaged when a total or subtotal is taken from a transaction totalizer of row 22, a lever 378''' is pivotally mounted on a pin 377''' provided on the hooked arm 130''', one arm of the said lever having attached thereto a spring 379''' while the other arm thereof has mounted thereon a roller 380'''. The pivot of the roller 380''' has arranged thereon a locking member 381''', a pin 383''' of which is guided in a slot 384''' of the hooked arm 130'''. By setting the lever 18 to total or subtotal taking, a portion of greater diameter of the disk 376''' passes beneath the roller 380''' (Fig. 9). By depressing a transaction key 15 the hooked arm 130''' is counter-clockwisely rocked and thereby the roller 380''' prevented by the portion of greater diameter of the disk 376''' from rotating in counter-clockwise direction. Consequently, the toggle joint formed by the lever 378''' and the locking member 381''', is stretched against the action of the spring 379''', whereat the pin 383''' slides in the slot 384''', and the locking member 381''' is rocked clockwisely to some extent. Thereby the front edge of the locking member 381''' is moved into the path of a bent off portion 385 (Fig. 9, 35) of a bail 386 pivotal on the release shaft 117, the said bail being connected by means of a bail 387 to the hooked arm 130 associated with the first totalizer row 19. Due to this, the hooked arm 130 can not be rocked clockwisely, and, hence, the totalizer row 19 can not be engaged with the disk 119.

As shown in Fig. 35, the locking member 381''' has connected thereto still another locking member 381'''' moved, when the hooked arm 130''' is rocking in counter-clockwise direction, into the path of a bent off portion 385' of a bail 386' pivotal on shaft 117. The bail 386' is connected by a bail 387' to the hooked arm 130' allotted to the second totalizer row 20. By means of the locking member 381'''' moved into effective position, the hooked arm 130' is prevented from rotating in counter-clockwise direction (Fig. 14), so that the associated totalizer row 20 is not engaged with the disk 119.

Further, a bent off portion 385''' of the hooked arm 130''' when rocking in counter-clockwise direction, engages from beneath a locking member 381'' (Fig. 35) pivoted on the hooked arm 130'' allotted to the third totalizer row 21. As, by setting the lever 18 to total or subtotal taking, a disk 376'' has been positioned underneath the roller 380'', the toggle joint 381'', 378'' cannot be stretched, and, as a consequence, the hooked arm 130'' cannot rock counter-clockwisely. Hence the third totalizer row 21 is not engaged with the disk 119. In this manner all the remaining totalizer rows are locked against engagement after the lever 18 is set to "total taking" and a transaction key 15 is depressed.

When a total is to be taken from a special totalizer of the rows 19, 20 or 21, the totalizer row pertaining to the special key 12, or 13, or 14, depressed is engaged with the disk 119 in the same manner as set forth in connection with the amount entering operations. To prevent engagement of any other totalizer row with the disk 119, than the one pertaining to the special key depressed, each of the three hooked arms 130, 130', 130'' has mounted thereon an appropriate locking member 381, 381', and 382''. Each of the said locking members has allotted thereto a cam disk 376, 376', or 376'' having portions of greater diameter passing beneath the rollers 380, 380' and 380'' when the lever 18 is set to total or subtotal taking.

The locking is effected as follows:—

When, with the machine conditioned for total or subtotal taking, a clerk's key 13 (Fig. 3) is depressed and thereby the respective hooked arm 130 rocked, the bent off portion 385 of the arm 386 connected to the hooked arm 130, engages from beneath the locking member 381''' (Fig. 35). The corresponding hooked arm 130''' cannot rock, and the fourth totalizer row not be engaged with the engaging disk 119. Further, by the hooked arm 130 rocked the locking member 381 arranged thereon comes into the path of a bent off portion 315 of an arm 316 connected by a bail 317 to the hooked arm 130''' allotted to the third totalizer row. Thus the hooked arm 130'' cannot be rocked and, consequently, the third totalizer row not be engaged with the disk 119. It is not necessary to provide a special locking for the hooked arm 130' associated with the second totalizer row, as the keys 14 are locked against depression after a key 13 is depressed.

When a total or subtotal is to be taken from any totalizer of the second totalizer row, and the hooked arm 130' has been rocked upon depressing a key 14, the locking member 381' is moved into the path of a bent off portion 385'' of the hooked arm 130'' thereby preventing the third totalizer row from being engaged with the disk 119. Further, the bent off portion 385' of the arm 386' connected to the hooked arm 130' engages from beneath the locking member 381''' thereby preventing the hooked arm 130''' from being rocked and the fourth totalizer row 22 from being engaged with the disk 119. No special locking member for the hooked arm 130 of the first totalizer row is provided, as all the keys 13 are locked after a clerk's key 14 is depressed.

Finally, when a total or subtotal is to be taken from a totalizer of the third totalizer row, and a department key 12 is depressed, the bent off portion 385'' of the hooked arm 130'' thereby rocked extends over the locking member 381' of the hooked arm 130' and the bent off portion 315 of the arm 316 beneath the locking member 381 of the hooked arm 130. Consequently, the first and the second totalizer rows cannot be engaged with the disk 119. Further, when the hooked arm 130'' is rocked, the locking member 381''' mounted thereon, is moved into the path of the bent off portion 385''' of the hooked arm 130''' and prevents the fourth totalizer row from engaging with the disk 119.

When a total is taken from a special totalizer, the totalizer selecting key functions simultaneously as motor key. As regards the transaction keys 15, the release of the machine is effected in the same manner as in single amounts entering actions. However, in order to release the machine for taking a total from a clerk's totalizer by depressing a clerk's key 13 or 14 only the clerk's key bank 13, 14 has arranged thereat a detent 388 (Fig. 27), which is moved downward upon a pin 30 of one of these keys entering an inclined slot 389 of said detent 388. A pin 390 of the detent 388 projects into a recess of a lever 391 a pin 392 of which is guided in an inclined slot 393 of an arm 394 of a bail 395 pivotal on shaft 81 (Fig. 24). The other arm 396 of the bail 395 has secured thereto a pivot 397 for a lever 398, the lower end of which is slotted to embrace a pin 399 of an arm 400 of the bail 89.

When the lever 18 is set to "add" or "itemizing", and, now, a clerk key 13, or 14 is depressed, the detent 388 is moved downward (Fig. 27), and the lever 391 rocked idly in counter-clockwise direction about the pin 392, which movement does not affect the position of the arm 394 and the release of the machine.

Into the triangular slot 401 of the lever 391 a pin 402 of a detent 403 projects. With the lever adjusted to "add" or "itemizing", and a clerk's key 13, or 14 depressed the pin 402 permits the lever 391 to rock counter-clockwisely. The detent 403 has also a pin 404 guided in a curved slot 405 of a disk 406 rotatable on shaft 278. The disk 406 is connected by means of a link 407 to an arm 408 secured to the release shaft 272. With the lever 18 set to total or subtotal taking, the shaft 272 and in connection therewith also the disk 406 are clockwisely rotated. Thereat the curved slot 405 cooperating with the pin 404, raises the detent 403 and moves the pin 402 into the upper corner of the slot 401 (see Fig. 28). By depressing a clerk's key 13, or 14, the detent 388 is moved downward, the lever 391 is rocked in counter-clockwise direction about the pin 402. The pin 392 travels upward in the inclined slot 393 and rocks the arm 394, and thus the bail 395 and the arm 396 (Fig. 24) in counter-clockwise direction. The upper slotted end of the lever 398 embraces a pin 409 of an arm 410. Since this arm 410 is not displaced when a clerk's key 13, or 14, is depressed, the pin 397 rocks, when the arm 396 is rocking in counter-clockwise direction, the lever 398 about the pin 409 in clockwise direction. This lever 398 rocks counter-clockwisely by the pin 399 the bail 89, and its pin 86 the lever 87 about the pin 84. The upper slotted end 90 of the lever 87 acting upon the pin 91 rocks the arm 92 in counter-clockwise direction and removes the hooked arm 94 connected to the arm 93 from the path of the projection 95 of the arm 97. Thereby the machine is released as specified heretobefore.

The department key bank 12 has allotted thereto a similar device (Figs. 28, 29). Corresponding parts are referred to by the same reference numerals as in Fig. 27 having, however, added thereto an index '. The arm 394' is connected by a sleeve 411 (Fig. 24) to the arm 410. Figs. 28 and 29 show the arrangement of parts with the lever 18 set to "subtotal" and "total" respectively. Thereat, with a key 12 depressed, the lever 391' rocks the arm 394' and 410 clockwisely as the direction of the inclined slot 393' is contrary to that of the slot 393 of the arm 394. During this clockwise rotation the arm 410 rocks by means of the pin 409 the lever 398 about the pin 397 in clockwise direction and by the pin 399 the bail 89 in counter-clockwise direction. The pin 86 of the bail 89 rocks the lever 87, the arms 92 and 94 also counter-clockwisely and removes the hooked arm 94 from the path of the projection 95 of arm 97 thus releasing the machine for operation.

The depressed department key 12 is released at the end of a total or subtotal taking operation in the same manner as done by the release shaft 301 (Fig. 21) when single amounts are entered, as also for total actions a portion of greater diameter of the disk 417 maintains the pawl 303 in the path of the square pin 314.

As mentioned already, the transaction keys 15 with the machine at rest, are locked and released only by depressing an amount key. At total or subtotal taking operations the amount keys are not depressed. Hence, in order to release the transaction keys 15 depressed in a total or subtotal taking action, a lever 412 is loosely mounted on shaft 47 (Fig. 17), of which lever the upper arm extends into the path of the pin 170 of the detent 165, and the lower arm is connected to a pitman 413. A roller 414 of said pitman 413 is guided in a cam groove 415 of a cam disk 294 fast on shaft 272. By adjusting the lever 18 to total or subtotal taking the shaft 272 is rocked counter-clockwisely and the pitman 413 moved to the left, whereby the lever 412 is clockwisely rocked. Thereat the upper arm of the lever 412 raises by the pin 170 the detent 165 and removes the lugs 167 from the path of the pins 168 of the transaction keys 15. The lever 412 functions when the lever 18 is set to total or subtotal taking as does the arm 171 when the shaft 47 is clockwisely rotated by depressing an amount key.

While the form of mechanism herein shown and described, is admirably adapted to fulfill the objects primarily stated, it is to be understood that it is not intended to confine the invention to the embodiments herein disclosed, for it is susceptible of embodiment in various other forms all coming within the scope of the claims which follow.

What is claimed as new is:

1. In a machine of the class specified, several control key banks, a machine conditioning means, a machine releasing means, and actuating means for said releasing means comprising a rockable member having a variable centre of movement controlled by said control key banks in cooperation with the machine conditioning means in accordance with the condition of the machine determined by the conditioning means.

2. In a machine of the class described, the combination of a row of interspersed totalizers, a bank of control keys, a manipulative device settable to a plurality of positions for conditioning the machine for add operations, a differentially positionable member to select a totalizer, a differential mechanism set under control of the keys for differentially positioning said member, and connections between the manipulative device and said member to adjust the member into a position corresponding to the position of the manipulative device, whereby the member selects one totalizer when differentially positioned under control of the keys with the device in one add position, and another totalizer when the device is in another add position.

3. In a machine of the class described, the combination of a row of totalizers mounted on a common support, a bank of control keys, a manipulative device settable to a plurality of positions for conditioning the machine for add operations, a differentially settable member to select a totalizer from the row of totalizers for adding, a mechanism operable under the joint control of the keys and the manipulative device to adjust said member, and means operated by the member to select one totalizer when the device is in one add position and another totalizer when the device is in another add position.

4. In a machine of the class described, the combination of a plurality of totalizers on a common support, means to shift the support to select a totalizer for adding operations, control keys, a manipulative device, means differentially positionable to select a totalizer, connections between the device and the totalizer selecting means to adjust the selecting means according to the position of the manipulative device, and means controlled by the control keys whereby the totalizer selecting means is adjusted by the manipulative device to select one totalizer under control of a certain key when the device is in one position and select another totalizer under control of said certain key when the manipulative device is in another position.

5. In a machine of the class described, the combination of a plurality of totalizers on a common shiftable support, actuators therefor, means to shift the support to shift the totalizers relatively to the actuators to select a totalizer for actuation, a plurality of keys, one of said keys normally controlling the shifting means to select a certain one of the totalizers, and a manipulative device to change the normal relationship between the shifting means and the keys so that said one of the keys selects another totalizer.

6. In a machine of the class described, the combination of a plurality of totalizers shiftably mounted on a common support, actuators for the totalizers, shifting means to shift the totalizers relatively to the actuators, a key to select one of the totalizers, a differential mechanism set under control of the key, said differential mechanism and shifting means normally related to each other so that a certain totalizer is selected when the differential is set under control of said key, and a manipulative device settable prior to the setting of the differential under control of the key to change the relationship between the shifting means and the differential mechanism so that upon subsequent setting of the differential mechanism under control of the key a different totalizer is shifted into relation with the actuators.

7. In a machine of the class described, the combination of a plurality of interspersed totalizers, shiftably mounted on a common support, actuators for the totalizers, a drum cam operatively connected with the totalizer support to shift the totalizers in relation to the actuators to select a certain totalizer for actuation thereby, a control key, a differential mechanism connected with the drum cam and controlled by the key to shift the said certain totalizer into operating relationship with the actuators, the normal relationship between the drum cam and the differential mechanism being such that said certain totalizer is selected upon operation of the machine after depressing said certain key, a lever settable from a normal position to an adjusted position, and connections between the lever and drum to change the relationship between the drum cam and differential mechanism when the lever is moved out of its normal position so that upon subsequent operation of the machine the said key controls the differential mechanism to select a different totalizer.

8. In a machine of the class described, the combination of a plurality of interspersed totalizers shiftably mounted on a common support, actuators for the totalizers, a drum cam operatively connected with the totalizer support to shift the totalizers in relation to the actuators to select a certain totalizer for actuation thereby, a control key, a differential mechanism, a planetary gear connection between the differential mechanism and the drum cam for rotating the drum cam into a position controlled by the key to shift a certain totalizer in operating relationship with the actuators, a lever settable from a normal position into an adjusted position, and connections between the lever and the planetary gear connection to rotate the drum cam without affecting the control of the drum cam by the differential mechanism so that when the drum cam is later adjusted by the differential under control of the key a different totalizer is shifted into operative relation with the actuators.

9. In a machine of the class described, the combination of a totalizer, actuators therefor, means to engage the totalizer with the actuators including a rockable disk, a plurality of means adapted to be coupled to the disk to rock the disk each means rockable during a different time during the machine operations, a manipulative device settable into a plurality of positions, and a separately mounted cam member associated with each means to rock the disk and actuated by the manipulative device when moved into its various positions to selectively couple a means to rock the disk, to the disk.

10. In a machine of the class described, the combination of a totalizer, actuators therefor, means to engage the totalizer with the actuators, including a member operable at different times during the machine operation to vary the time the totalizer is engaged with the actuators, a plurality of driving mechanisms for the member each driving mechanism operable at a different time during the machine operation, a cam associated with each driving mechanism, each cam having a cam slot whose contour is different from the contours of the other cam slots, a manipulative device, and means on the manipulative device projecting into the cam slots and adapted to adjust the cams upon manipulation of the device to connect a different driving mechanism with the member for each position of the manipulative device.

11. In a machine of the class described, the combination of a plurality of interspersed totalizers; actuators to enter items into the totalizers and to reset the totalizers to zero; a common supporting means for the totalizers; a plurality of manipulative devices; means under control of the manipulative devices to shift the supporting means to select the totalizers for engagement with the actuators; means to move the support to engage the selected totalizer with the actuators in rest timing to permit the actuators to transfer the total standing on the totalizer onto the actuators and to thereafter move the supporting means to disengage the said selected totalizer from the actuators; means operable to adjust one of said manipulative devices while the selected totalizer is disengaged from the actuators to readjust the totalizer supporting means to select any other of the totalizers while the total transferred to the actuators remains thereon, the position to which the supporting means is readjusted being determined by the manipulative devices, said moving means thereafter acting to engage the second selected totalizer with the actuators; and means to operate the actuators to transfer the total standing thereon into the second selected totalizer.

12. In a machine of the class described, the combination of a plurality of totalizers; an axle to support all of the totalizers; a plurality of manipulative devices to select totalizers for item entries and for resetting the totalizers to zero; a mode of operation means settable prior to a machine operation; means controlled by the mode of operation means to condition certain elements of the machine for transfer total operations, each complete transfer total operation consisting of a single cycle of operation of the machine; means set by the mode of operation means when set prior to a machine operation to select the totalizer from which the total is to be transferred; and means operable during the machine operation for readjusting the mode of operation means, and thereby readjusting the means set by the mode of operation means, to select a totalizer into which the total from the first selected totalizer is transferred, the position to which the means set by the mode of operation means is readjusted being determined by the manipulative devices.

13. In a machine of the class described, the combination of a plurality of interspersed totalizers; actuators therefor; a single support for said totalizers; means to select one of the totalizers for engagement with the actuators; means to engage the selected totalizer with the actuators to enable the transfer of the total standing on the selected totalizer onto the actuators; means to control the operation of the actuators, the totalizer selecting means, and the engaging means to transfer the total transferred to the actuators into any other selected totalizer on said single support; and main operating means to operate the actuators, the totalizer selecting means, and the engaging means under control of said control means to cause the total to be transferred from said one selected totalizer into said other selected totalizer during a single cycle of operation of the machine.

14. In a machine of the class described, the combination of a plurality of interspersed totalizers mounted on a common support; actuators to transfer the amount standing on one totalizer to any other totalizer mounted on said common support; totalizer selecting means operable to perform two separate selecting operations during a single cycle of operation of the machine; manipulative devices; and means controlled by the manipulative devices to control the selecting means in its second selecting operation to select any one of said other totalizers to receive the amount to be transferred thereto.

15. In a machine of the class described, the combination of a plurality of interspersed totalizers on a common support; actuators for transferring the amount on a certain one of the totalizers to any selected one of the other of said totalizers; totalizer selecting means operable to select said certain one totalizer during the first part of a single cycle of operation of the machine and to select another totalizer during the latter part of the said single cycle of operations of the machine; and means to control the selecting means in said latter part of said cycle to select any one of the totalizers into which the total is to be transferred.

ERNST BREITLING.
HANS SCHWENK.